(12) United States Patent
Yoshimochi et al.

(10) Patent No.: US 11,074,023 B2
(45) Date of Patent: Jul. 27, 2021

(54) TRANSMISSION DEVICE

(71) Applicant: Sony Semiconductor Solutions Corporation, Kanagawa (JP)

(72) Inventors: Naoki Yoshimochi, Tokyo (JP); Tatsuya Sugioka, Tokyo (JP); Tomohiro Takahashi, Kanagawa (JP); Takahiro Iinuma, Kanagawa (JP); Koji Yoda, Kanagawa (JP); Miho Ozawa, Kanagawa (JP); Yoshiaki Inada, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/759,867

(22) PCT Filed: Oct. 15, 2018

(86) PCT No.: PCT/JP2018/038265
§ 371 (c)(1),
(2) Date: Apr. 28, 2020

(87) PCT Pub. No.: WO2019/093072
PCT Pub. Date: May 16, 2019

(65) Prior Publication Data
US 2020/0333993 A1    Oct. 22, 2020

(30) Foreign Application Priority Data

Nov. 10, 2017  (JP) .............................. JP2017-217484

(51) Int. Cl.
*G06F 3/14*        (2006.01)
(52) U.S. Cl.
CPC ..................................... *G06F 3/14* (2013.01)

(58) Field of Classification Search
CPC ........................................................ G06F 3/14
See application file for complete search history.

(56) References Cited

U.S. PATENT DOCUMENTS 9,485,381 B1    11/2016  Hunter
2009/0067626 A1*  3/2009  Dufaux ................. H04N 19/61
                                                380/217
(Continued)

FOREIGN PATENT DOCUMENTS

JP    2012-209831 A    10/2012
JP    2013-164834 A     8/2013
(Continued)

OTHER PUBLICATIONS

Mahesh M. Subedar, Lina J. Karam, and Glen P. Abousleman; An Embedded Scaling-Based Arbitrary Shape Region-Of-Interest Coding Method for JPEG2000; 2004; IEEE; 2004 IEEE International Conference on Acoustics, Speech, and Signal Processing; vol. 3; pp. 681-684. (Year: 2004).*

(Continued)

*Primary Examiner* — Jeffery A Brier
(74) *Attorney, Agent, or Firm* — Michael Best & Friedrich LLP

(57) ABSTRACT

There is provided a transmission device including: an image processing unit that sets region information corresponding to a region set in an image for each of rows in the image and causes the set region information and region data corresponding to the region to be transmitted for each row. The region information includes information indicating a position of the row and information indicating a position of a column of the region included in the row.

20 Claims, 12 Drawing Sheets

(56) References Cited

U.S. PATENT DOCUMENTS

| | | | |
|---|---|---|---|
| 2010/0158099 A1* | 6/2010 | Kalva | ............... H04N 21/8543 |
| | | | 375/240.01 |
| 2010/0253848 A1 | 10/2010 | Nagajjanavar | |
| 2015/0049097 A1 | 2/2015 | Ju et al. | |
| 2016/0063948 A1 | 3/2016 | Han | |

FOREIGN PATENT DOCUMENTS

| | | |
|---|---|---|
| JP | 2014-039219 A | 2/2014 |
| JP | 2016-201756 A | 12/2016 |

OTHER PUBLICATIONS

Yong Tian and Xiangwei Kong; An Improved Shape-Based Arbitrary Shape ROI Coding Method With SA-DWT in JPEG2000; 2005; IEEE; vol. 2; pp. 373-376. (Year: 2005).*

NXP Semiconductors "MIPI-CS12 Peripheral on i.MX6 PMUs" Documents No. AN5305, NXP, Jul. 2016.

"The MIPI Membership Agreement", Jan. 1, 2006 (Jan. 1, 2006), Retrieved from the Internet: URL:http://mipi.org/sites/default/files/MIPI-MA-2006.pdf, XP055267770 [retrieved on Apr. 22, 2016].

"Draft MIPI Alliance Specification for Camera Serial Interface 2 (CSI-2)", "Draft MIPI Alliance Specification for Camera Serial Interface 2 (CSI-2)", Apr. 2, 2009 (Apr. 2, 2009), XP055165978 1-20 the whole document.

\* cited by examiner

[FIG. 1]
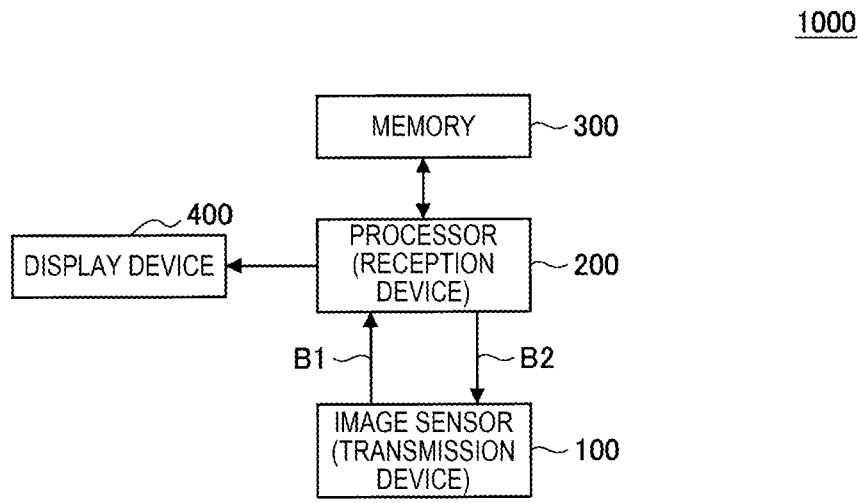
[FIG. 2]
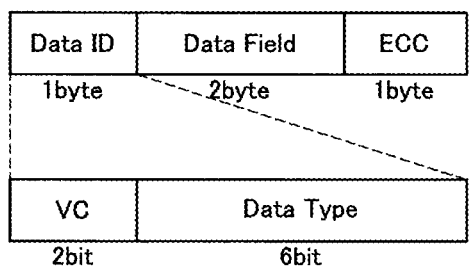
[FIG. 3]
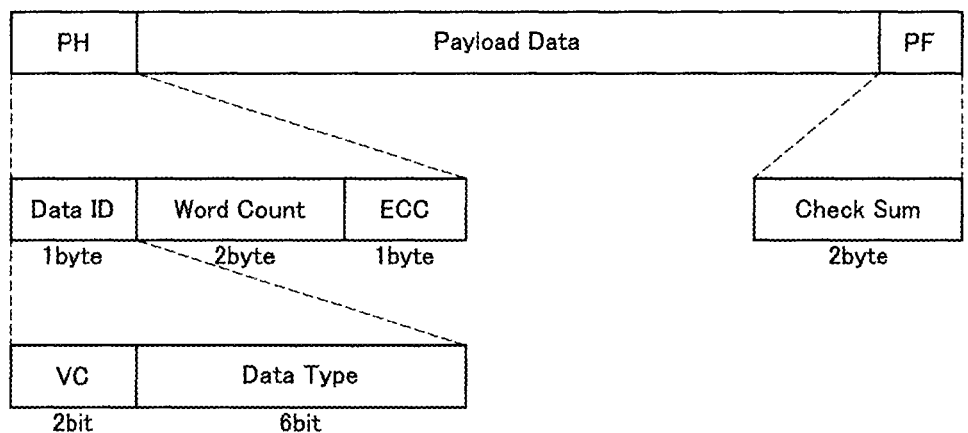

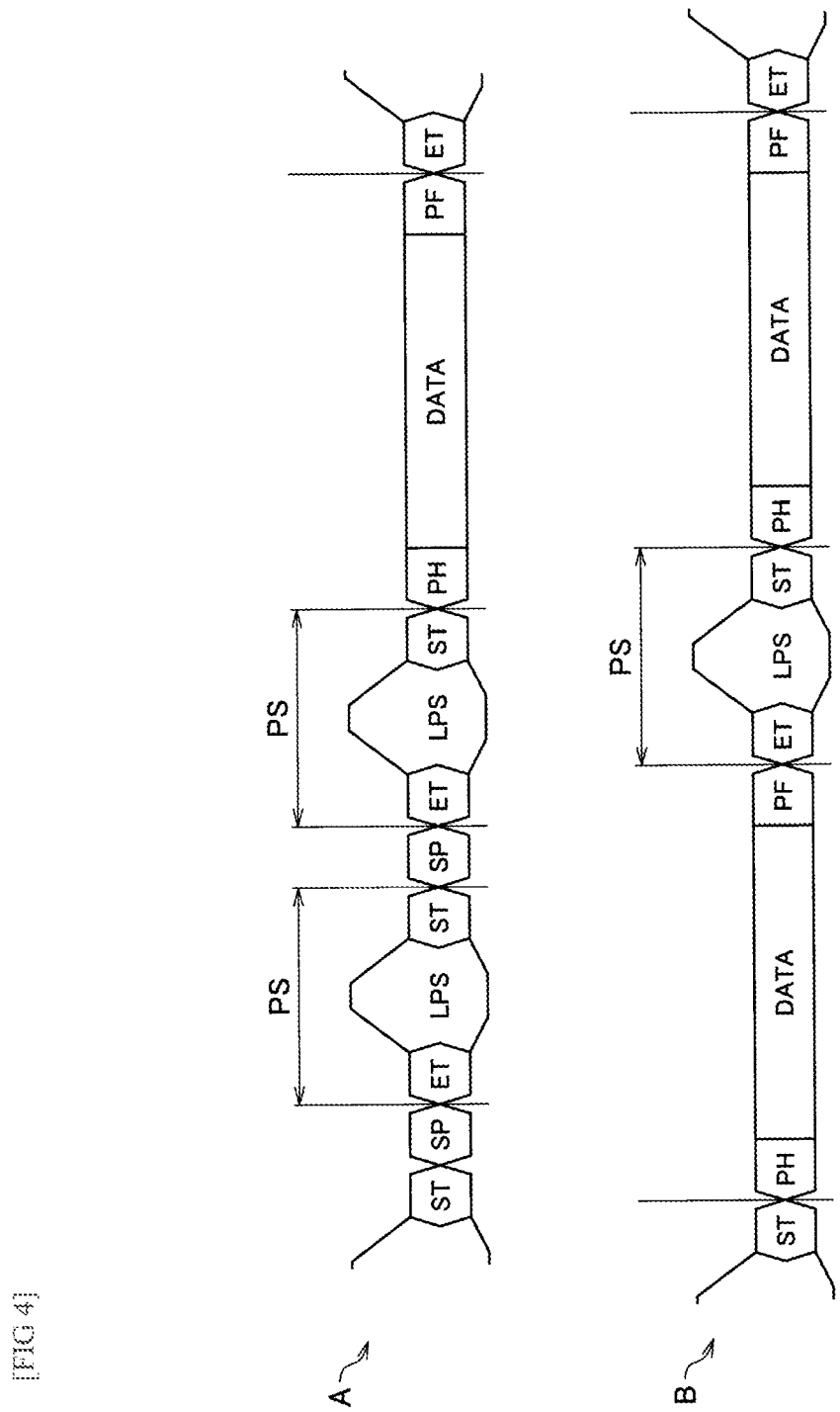

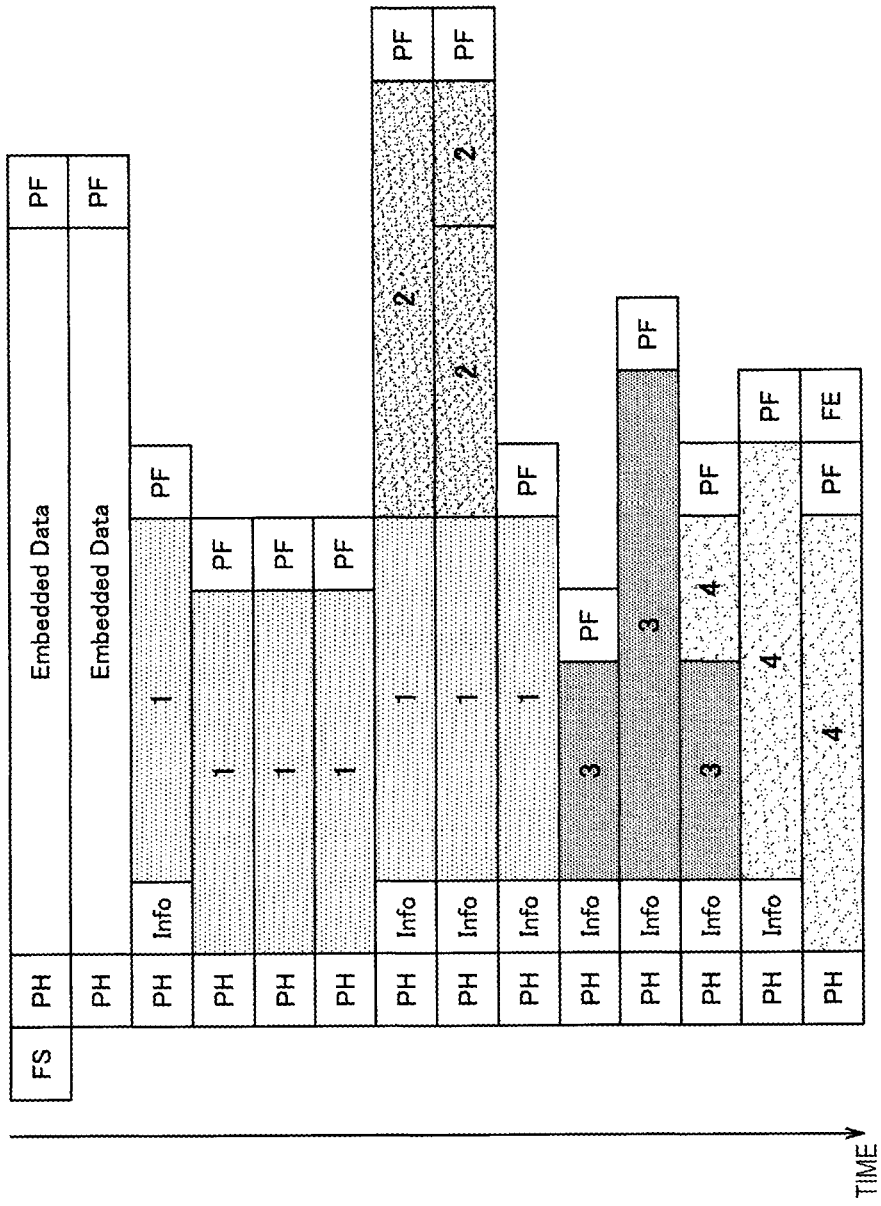
[FIG. 6]

[FIG. 7]
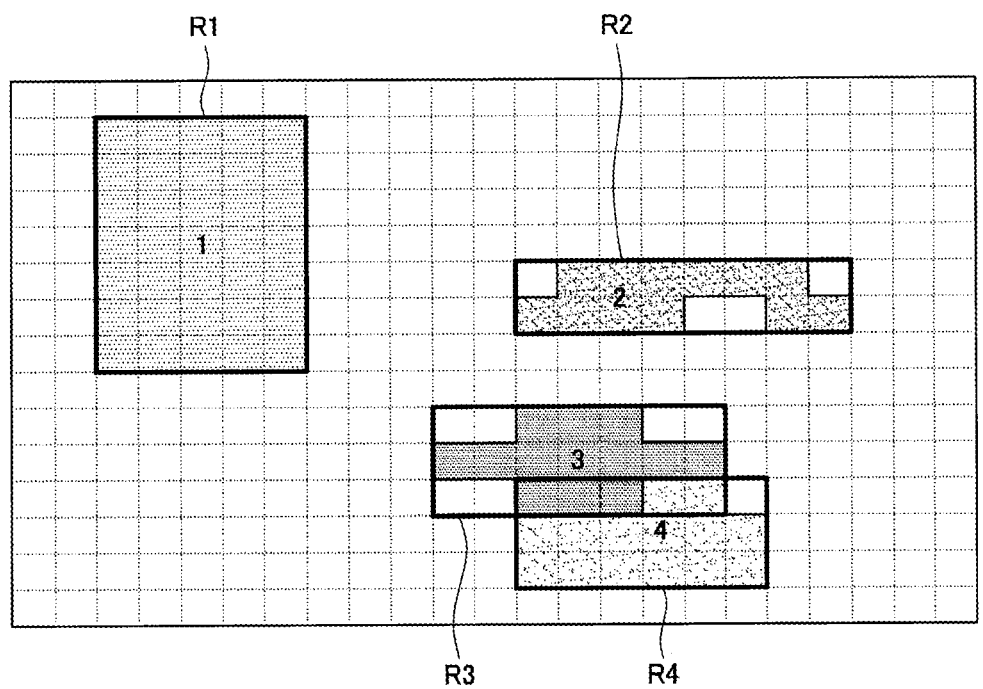

[FIG. 8]

| PH | ROI Info | ROI DATA | PF |

ROI Info: | ROI Info TYPE | ROI Info Parameter |

| ROI Info Type[3:0] | | | | | | | | | | | | | |
|---|---|---|---|---|---|---|---|---|---|---|---|---|---|
| 4'b0000 | SETTING NOT NECESSARY | | | | | | | | | | | | |
| 4'b0001, 4'b0010, 4'b0011 | SETTING INHIBITED | | | | | | | | | | | | |
| 4'B0100 | Num of ROI | 1st ROI ID | 2nd ROI ID | Last ROI ID | | | | | | | | | |
| 4'B0101 | Num of ROI | 1st ROI ID | 1st ROI LEN | 2nd ROI ID | 2nd ROI LEN | Last ROI ID | Last ROI LEN | | | | | | |
| 4'B0110 | Num of ROI | 1st ROI ID | 1st ROI X | 2nd ROI ID | 2nd ROI X | Last ROI ID | Last ROI X | | | | | | |
| 4'B0111 | Num of ROI | 1st ROI ID | 1st ROI LEN | 1st ROI X | 2nd ROI ID | 2nd ROI LEN | 2nd ROI X | Last ROI ID | Last ROI LEN | Last ROI X | | | |
| 4'B1000 | Y | | | | | | | | | | | | |
| 4'b1001, 4'b1010, 4'b1011 | SETTING INHIBITED | | | | | | | | | | | | |
| 4'B1100 | Y | Num of ROI | 1st ROI ID | 2nd ROI ID | Last ROI ID | | | | | | | | |
| 4'B1101 | Y | Num of ROI | 1st ROI ID | 1st ROI LEN | 2nd ROI ID | 2nd ROI LEN | Last ROI ID | Last ROI LEN | | | | | |
| 4'B1110 | Y | Num of ROI | 1st ROI ID | 1st ROI X | 2nd ROI ID | 2nd ROI X | Last ROI ID | Last ROI X | | | | | |
| 4'B1111 | Y | Num of ROI | 1st ROI ID | 1st ROI LEN | 1st ROI X | 2nd ROI ID | 2nd ROI LEN | 2nd ROI X | Last ROI ID | Last ROI LEN | Last ROI X | | |

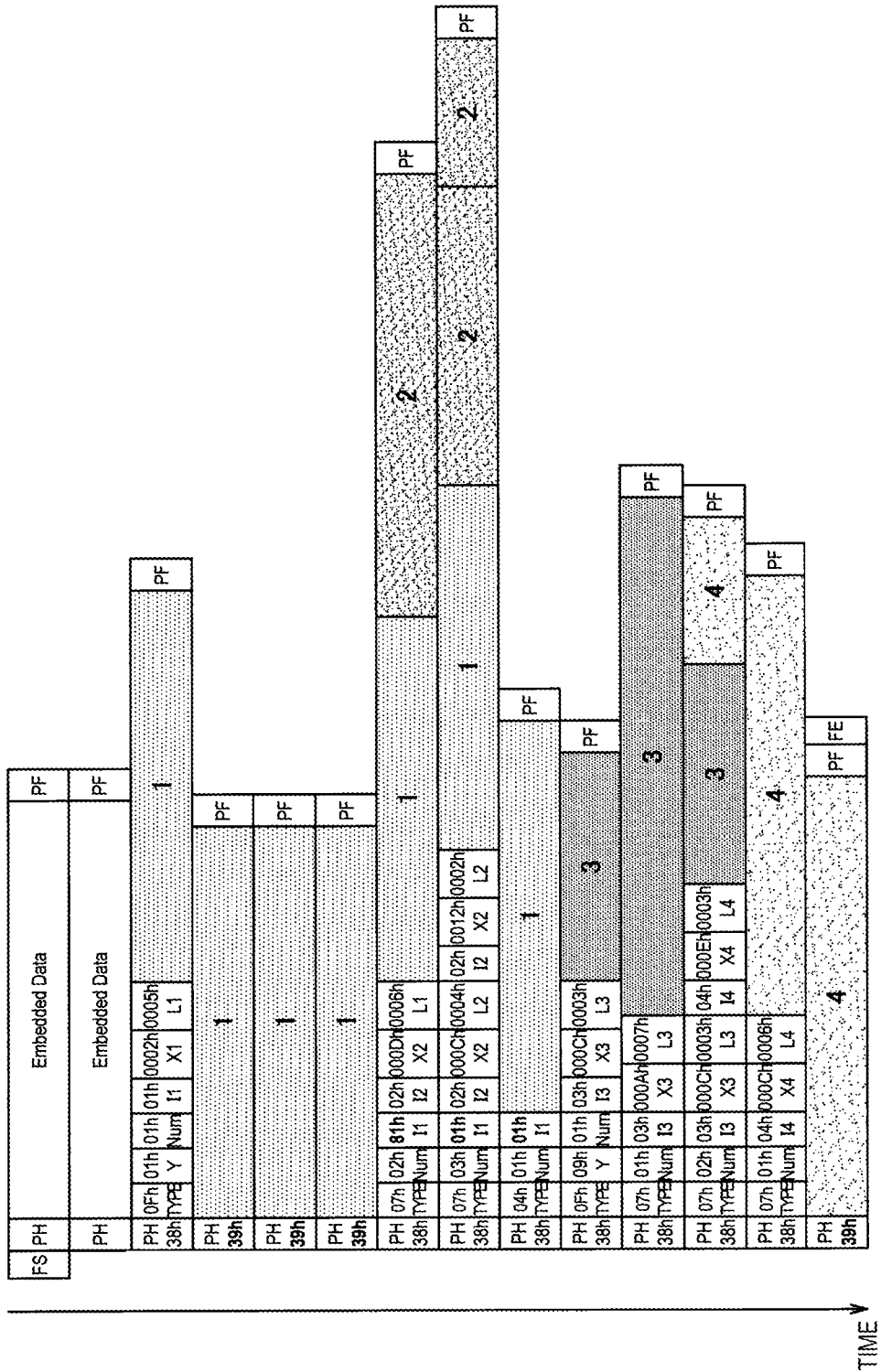
[FIG. 9]

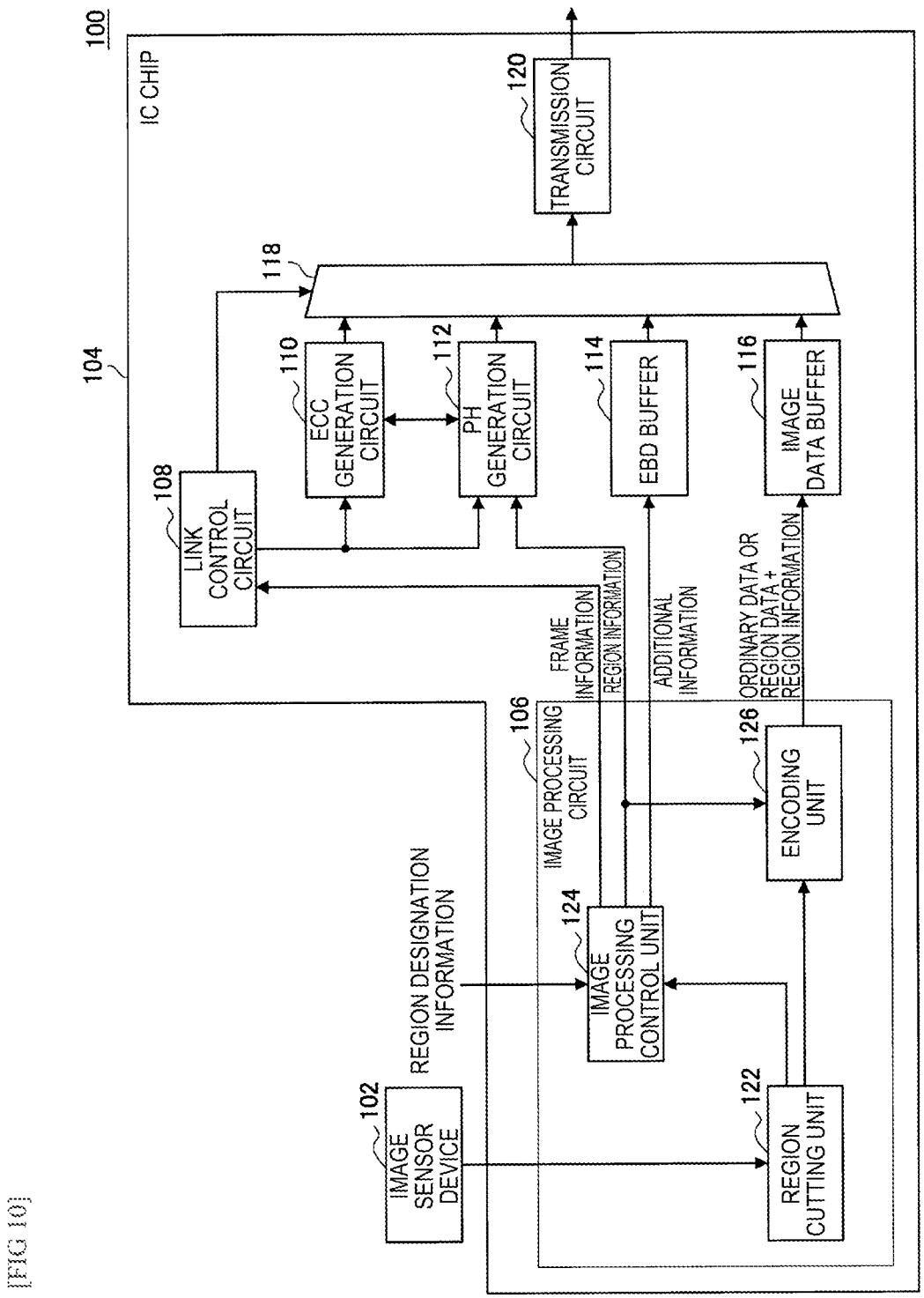
[FIG. 10]

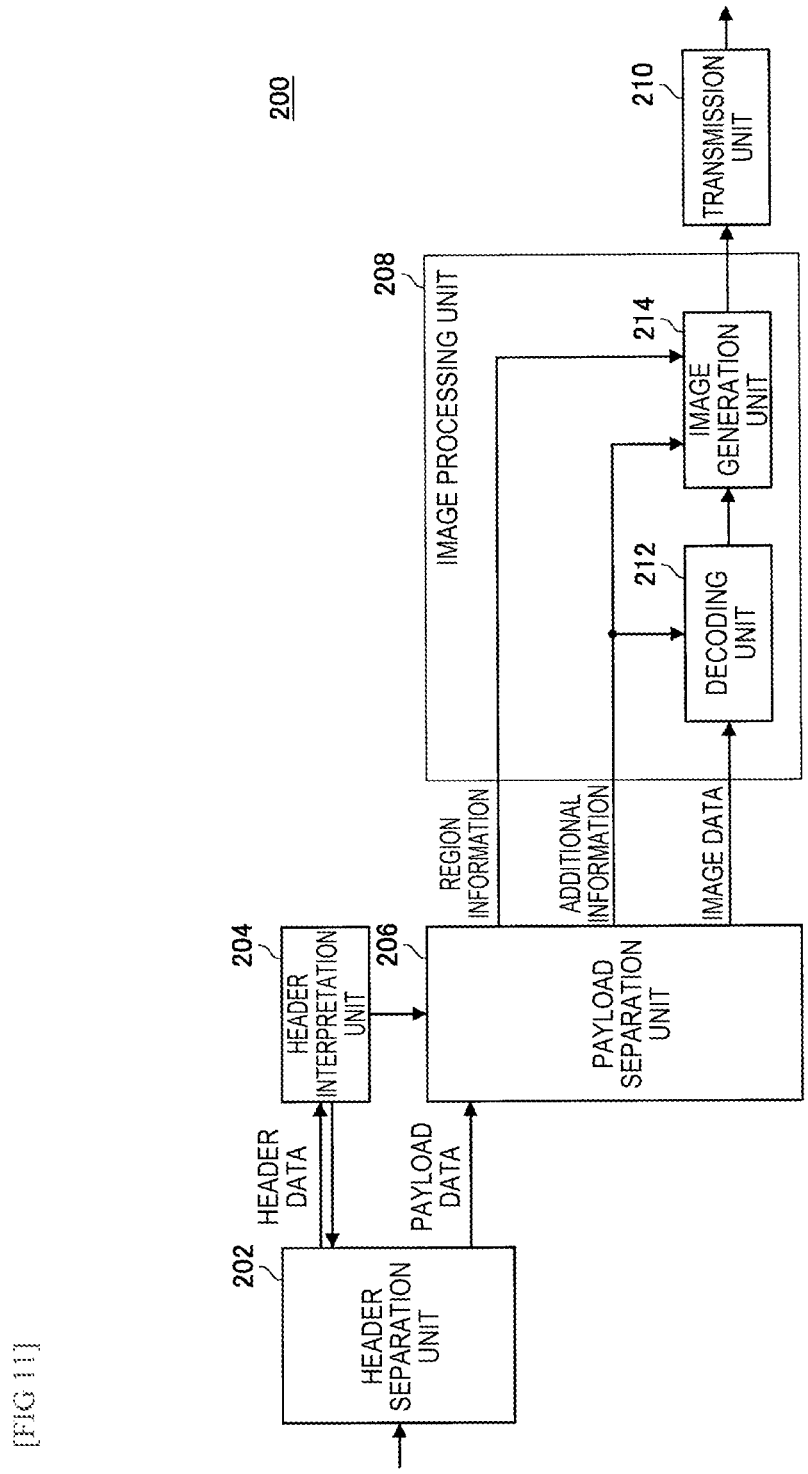

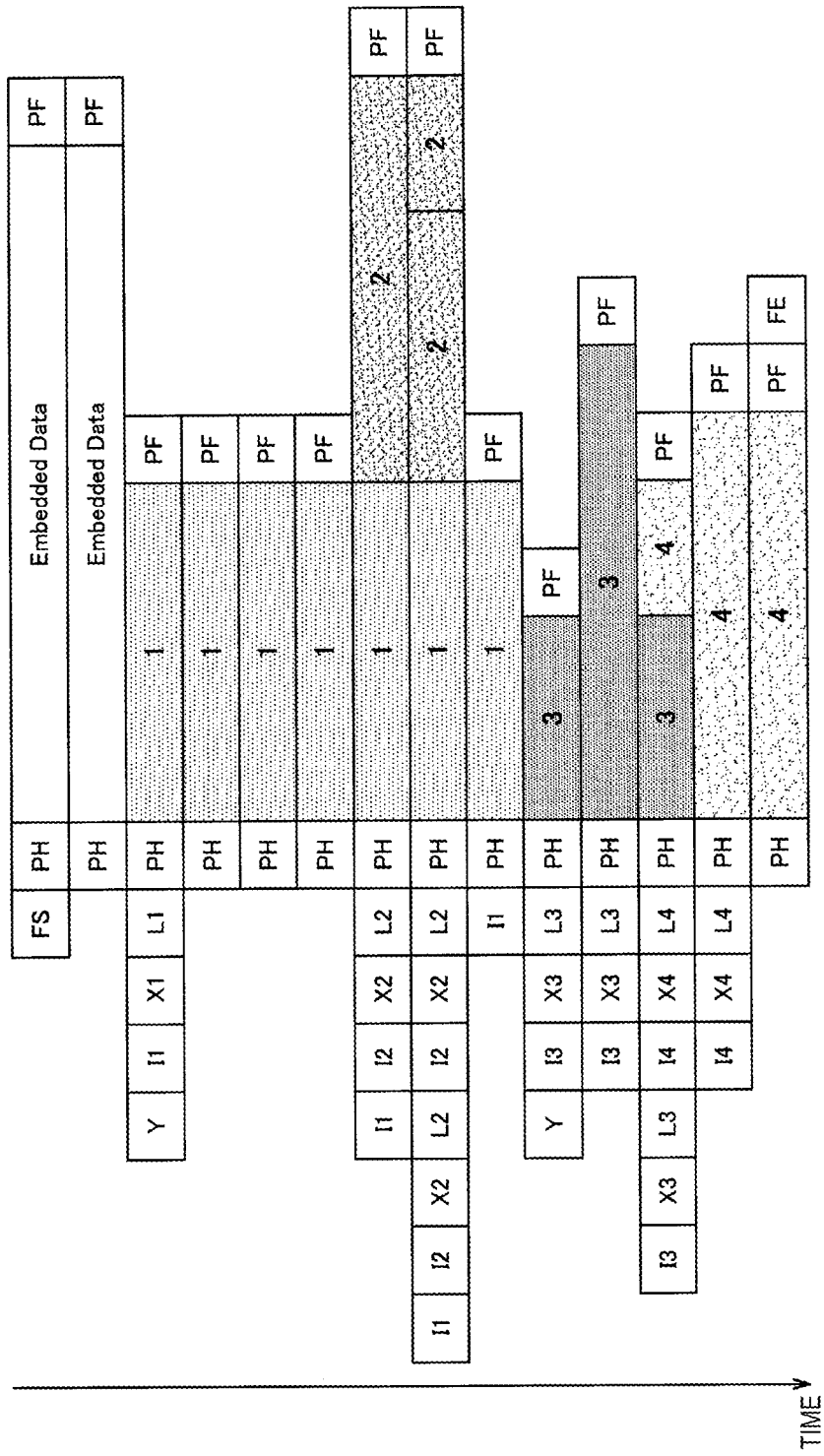
[FIG. 12]

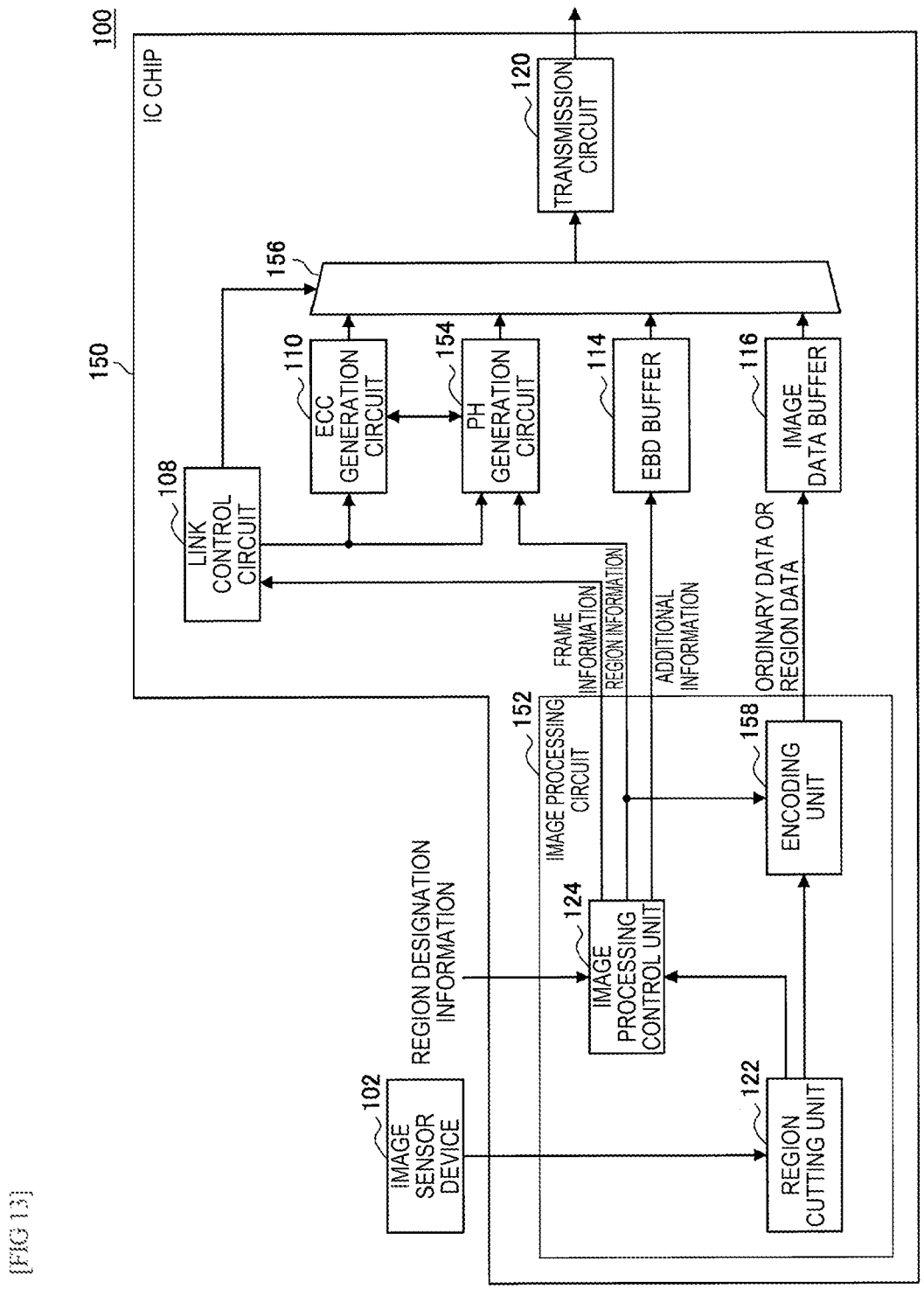

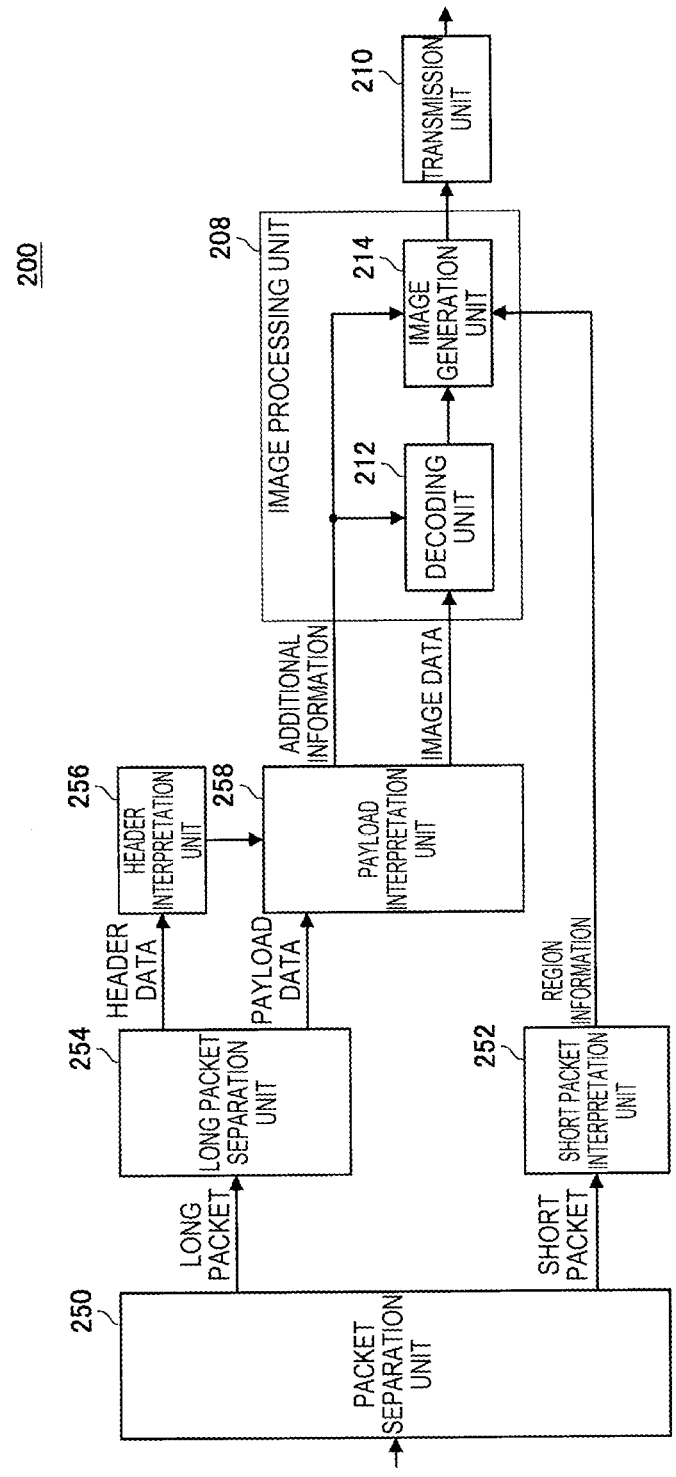

TRANSMISSION DEVICE

CROSS REFERENCE TO RELATED APPLICATIONS

This application claims the benefit of Japanese Priority Patent Application JP 2017-217484 filed Nov. 10, 2017, the entire contents of which are incorporated herein by reference.

TECHNICAL FIELD

The present disclosure relates to a transmission device.

BACKGROUND ART

Technologies for cutting a partial region of an image captured by an imaging device and transferring data of the cut region have been developed. The technology described in PTL 1 below, for example, can be listed among the aforementioned technologies. In addition, the technologies described in Patent Literatures 2 to 4 below, for example, can be listed among the technologies for cutting a partial region of an image.

CITATION LIST

Patent Literature

[PTL 1]
JP 2016-201756A
[PTL 2]
JP 2013-164834
[PTL 3]
JP 2012-209831A
[PTL 4]
JP 2014-39219A

SUMMARY

Technical Problem

In a case in which the technology described in PTL 1 is used, for example, it is possible to cut a partial region from an image and transfer data of the cut region. Therefore, since the amount of data related to the transfer is smaller in a case in which the image of the region cut by using the technology described in PTL 1 is transferred than in a case in which the entire image is transferred, there are advantages, such as an advantage that a transfer time is shortened.

However, the cut region according to the technology described in PTL 1 is a rectangular region, and transferring data in a region with another shape is not particularly taken into consideration. In addition, cut regions are also rectangular regions according to the technologies of cutting partial regions of images as described in PTLS 2 to 4. Therefore, it is difficult to transfer data in a region with an arbitrary shape set in an image using the existing technologies in PTLS 1 to 4.

The present disclosure will propose a novel and improved transmission device capable of transmitting data in a region with an arbitrary shape set in an image.

Solution to Problem

According to an embodiment of the present disclosure, there is provided a transmission device including: an image processing unit that sets region information corresponding to a region set in an image for each of rows in the image and causes the set region information and region data corresponding to the region to be transmitted for each row. The region information includes information indicating a position of the row and information indicating a position of a column of the region included in the row.

Advantageous Effects of Invention

According to an embodiment of the present disclosure, it is possible to transmit data in a region with an arbitrary shape set in an image.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is an explanatory diagram illustrating an example of a configuration of a communication system according to an embodiment.

FIG. 2 is an explanatory diagram illustrating a format of a packet defined by MIPI CSI-2 standards.

FIG. 3 is an explanatory diagram illustrating a format of a packet defined by MIPI CSI-2 standards.

FIG. 4 is an explanatory diagram illustrating an example of a signal waveform related to transmission of a packet in accordance with the MIPI CSI-2 standards.

FIG. 6 is an explanatory diagram illustrating an example of data transmitted according to a first transmission scheme related to a transmission method according to the embodiment.

FIG. 7 is an explanatory diagram for describing an example of Embedded Data transmitted according to the first transmission scheme related to the transmission method according to the embodiment.

FIG. 8 is an explanatory diagram illustrating an example of a configuration of a long packet transmitted according to the first transmission scheme related to the transmission method according to the embodiment.

FIG. 9 is an explanatory diagram illustrating an example of data transmitted according to the first transmission scheme related to the transmission method according to the embodiment.

FIG. 10 is a hardware block diagram illustrating an example of a configuration of an image sensor corresponding to the first transmission scheme related to the transmission method according to the embodiment.

FIG. 11 is a functional block diagram illustrating an example of a configuration of a processor that is compatible with the first transmission scheme related to the transmission method according to the embodiment.

FIG. 12 is an explanatory diagram illustrating an example of data transmitted according to a second transmission scheme related to the transmission method according to the embodiment.

FIG. 13 is a hardware block diagram illustrating an example of a configuration of an image sensor that is compatible with the second transmission scheme related to the transmission method according to the embodiment.

FIG. 14 is a functional block diagram illustrating an example of a configuration of a processor that is compatible with the second transmission scheme related to the transmission method according to the embodiment.

DESCRIPTION OF EMBODIMENTS

Figure 5:
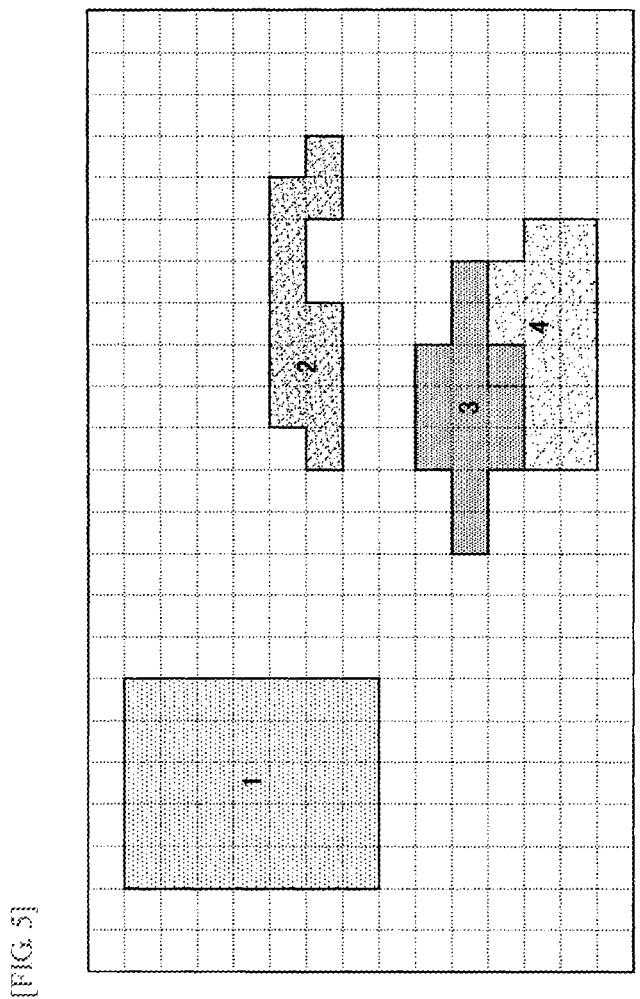
FIG. 5 is an explanatory diagram illustrating an example of a region set in an image.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, the order shown below will be used in the following description.

1. Transmission Method According to Embodiment
    <1> Configuration of communication system to which transmission method according to embodiment can be applied
    <2> Application example of communication system according to embodiment
    <3> Transmission method according to embodiment
    <4> Examples of advantages achieved by transmission method according to embodiment being used
2. Program According to Embodiment <<Transmission Method According to Embodiment>>

<1> Configuration of communication system to which transmission method according to embodiment can be applied First, an example of a configuration of a communication system to which a transmission method according to an embodiment can be applied will be described.

In the following description, a case in which a communication scheme between devices that are included in the communication system according to the embodiment is a communication scheme in accordance with Mobile Industry Processor Interface (MIPI) Camera Serial Interface 2 (CSI-2) standards will be exemplified. Note that the communication scheme between the devices that are included in the communication system according to the embodiment is not limited to the communication scheme in accordance with the MIPI CSI-2 standards. For example, the communication between the devices that are included in the communication system according to the embodiment may be another standard defined by the MIPI alliance, such as a communication scheme in accordance with MIPI CSI-3 standards or a communication scheme in accordance with MIPI Display Serial Interface (DSI). In addition, it is needless to say that the communication scheme to which the transmission method according to the embodiment can be applied is not limited to the communication scheme related to the standards defined by the MIPI alliance.

FIG. 1 is an explanatory diagram illustrating an example of a configuration of a communication system 1000 according to the embodiment. As the communication system 1000, a communication device such as a smartphone, a drone (equipment capable of performing operations through remote operations or autonomous operations), a moving body such as a vehicle, and the like are exemplified, for example. Note that the application examples of the communication system 1000 are not limited to the examples described above. Other application examples of the communication system 1000 will be described later.

The communication system 1000 has an image sensor 100, a processor 200, a memory 300, and a display device 400, for example.

The image sensor 100 has an imaging function and a transmission function and transmits data indicating an image generated by image capturing. The processor 200 receives data transmitted from the image sensor 100 and processes the received data. That is, the image sensor 100 serves as a transmission device while the processor 200 serves as a reception device, in the communication system 1000.

Note that although FIG. 1 illustrates the communication system 1000 that has one image sensor 100, the number of the image sensors 100 that the communication system according to the embodiment has is not limited to the example illustrated in FIG. 1. For example, the communication system according to the embodiment may have two or more image sensors 100.

In addition, although FIG. 1 illustrates the communication system 1000 that has one processor 200, the number of the processors 200 that the communication system according to the embodiment has is not limited to the example illustrated in FIG. 1. For example, the communication system according to the embodiment may have two or more processors 200.

In a communication system that has a plurality of image sensors 100 and a plurality of processors 200, the image sensors 100 and the processors 200 may have one-to-one correspondence, or one processor 200 may have correspondence with a plurality of image sensors 100. Alternatively, in the communication system that has a plurality of image sensors 100 and a plurality of processors 200, a plurality of processors 200 may have correspondence with one image sensor 100.

Even in the communication system that has a plurality of image sensors 100 and a plurality of processors 200, communication is performed between the image sensors 100 and the processors 200 similarly to the communication system 1000 illustrated in FIG. 1.

The image sensor 100 and the processor 200 are electrically connected to each other by a data bus B1. The data bus B1 is a transfer path of one signal for connecting the image sensor 100 and the processor 200. For example, data indicating an image transmitted from the image sensor 100 (hereinafter referred to as "image data" in some cases) is transferred from the image sensor 100 to the processor 200 via the data bus B1.

A signal transferred via the data bus B1 in the communication system 1000 is transferred according to a communication scheme in accordance with predetermined standards, such as MIPI CSI-2 standards, for example.

FIGS. 2 and 3 are explanatory diagrams illustrating formats of packets defined by the MIPI CSI-2 standards. FIG. 2 illustrates a format of a short packet defined by the MIPI CSI-2 standards, and FIG. 3 illustrates a format of a long packet defined by the MIPI CSI-2 standards.

The long packet is data including a packet header ("PH" illustrated in FIG. 3), a payload ("Payload Data" illustrated in FIG. 3), and a packet footer ("PF" illustrated in FIG. 3). The short packet is data that has a structure similar to the packet header ("PH" illustrated in FIG. 3) as illustrated in FIG. 2.

Virtual channel (VC) numbers ("VC" illustrated in FIGS. 2 and 3; VC values) are recorded in header portions of both the short packet and the long packet, and arbitrary VC numbers can be applied to each packet. Packets to which the same VC number is applied are handled as packets that belong to the same image data.

In addition, data type (DT) values ("Data Type" illustrated in FIGS. 2 and 3) are recorded in the header portions of both the short packet and the long packet. Therefore, it is also possible to handle packets to which the same DT value has been applied as packets that belong to the same image data similarly to the VC numbers.

The end of the packet is recorded as the number of words in Word Count in the header portion of the long packet. An error correcting code is recorded in ECC in the header portions of the short packet and the long packet.

According to the MIPI CSI-2 standards, a high-speed differential signal is used in a period during which a data signal is transferred, and a low-power signal is used in a blanking period of the data signal. In addition, the period during which the high-speed differential signal is used is called a high speed state (HPS) period while the period during which the low power signal is used is called a low power state (LPS) period.

FIG. 4 is an explanatory diagram illustrating an example of a signal waveform related to transmission of a packet in accordance with the MIPI CSI-2 standards. A in FIG. 4 illustrates an example of transfer of a packet, and B in FIG. 4 illustrates another example of transfer of a packet. "ST", "ET", "PH" "PF", "SP", and "PS" illustrated in FIG. 4 have the following meanings.

ST: Start of Transmission
ET: End of Transmission
PH: Packet Header
PF: Packet Footer
SP: Short Packet
PS: Packet Spacing As illustrated in FIG. 4, it is possible to recognize that an amplitude of a differential signal in the LPS period ("LPS" illustrated in FIG. 4) and a differential signal in the HPS period (other than "LPS" illustrated in FIG. 4) are different from each other. Therefore, it is desirable that as little of the LPS period as possible be included in view of improving transfer efficiency.

The image sensor 100 and the processor 200 are electrically connected to each other by a control bus B2 that is different from the data bus B1, for example. The control bus B2 is a transfer path for other signals, and connects the image sensor 100 to the processor 200. For example, control information output from the processor 200 is transferred from the processor 200 to the image sensor 100 via the control bus B2.

The control information includes information for control and processing commands, for example. As the information for control, data for controlling functions of the image sensor 100, such as one or two or more of data indicating an image size, data indicating a frame rate, and data indicating the amount of an output delay from reception of an image output command to an image output is exemplified. In addition, the control information may include identification information indicating the image sensor 100. As the identification information, arbitrary data with which it is possible to specify the image sensor 100, such as an ID set for the image sensor 100 is exemplified.

Note that the information transferred from the processor 200 to the image sensor 100 via the control bus B2 is not limited to the example described above. For example, the processor 200 may transfer region designation information designating a region in an image via the control bus B2. As the region designation information, data in an arbitrary form with which a region can be specified, such as data indicating a position of a pixel included in the region (for example, coordinate data representing a position of a pixel included in the region using coordinates), is exemplified.

Although FIG. 1 illustrates an example in which the image sensor 100 and the processor 200 are electrically connected to each other by the control bus B2, the image sensor 100 and the processor 200 may not be connected by the control bus B2. For example, the image sensor 100 and the processor 200 may transmit and receive control information and the like through wireless communication of an arbitrary communication scheme.

Hereinafter, the respective devices that are included in the communication system 1000 illustrated in FIG. 1 will be described.

<1-1> Memory 300

The memory 300 is a recording medium that the communication system 1000 has. As the memory 300, a volatile memory such as a random access memory (RAM) or a non-volatile memory such as a flash memory is exemplified. The memory 300 operates using electrical power supplied from an internal power source (not illustrated) that is included in the communication system 1000, such as a battery, or electrical power supplied from an external power source of the communication system 1000.

An image output from the image sensor 100, for example, is stored in the memory 300. The recording of the image in the memory 300 is controlled by the processor 200, for example.

<1-2> Display Device 400

The display device 400 is a display device that the communication system 1000 has. As the display device 400, a liquid crystal display and an organic electro-luminescence display (organic EL display), also known as an organic light emitting diode display (OLED display) are exemplified. The display device 400 operates using electrical power supplied from an internal power source (not illustrated) that is included in the communication system 1000, such as a battery, or electrical power supplied from an external power source of the communication system 1000.

Various images and screens, such as an image output from the image sensor 100, a screen related to an application that is executed by the processor 200, and a screen related to a user interface (UI), are displayed on a display screen of the display device 400. The display of the image and the like on the display screen of the display device 400 is controlled by the processor 200, for example.

<1-3> Processor 200 (Reception Device)

The processor 200 receives data transmitted from the image sensor 100 and processes the received data. As described above, the processor 200 serves as a reception device in the communication system 1000. An example of a configuration related to processing of data transmitted from the image sensor 100 (a configuration for serving as the reception device) will be described later.

The processor 200 includes one or two or more processors, various processing circuits, and the like that include arithmetic circuits such as a micro processing unit (MPU), for example. The processor 200 operates using electrical power supplied from an internal power source (not illustrated) that is included in the communication system 1000, such as a battery, or electrical power supplied from an external power source of the communication system 1000.

The processor 200 performs various kinds of processing such as processing related to control of recording of image data in the recording medium such as the memory 300, processing related to control of display of an image on the display screen of the display device 400, and processing of executing arbitrary application software, for example. As the processing related to the control of recording, "processing of delivering control data including a recording command and data that is caused to be recorded in the recording medium to the recording medium such as the memory 300" is exemplified. In addition, as the processing related to the control of the display, "processing of delivering control data including a display command and data that is caused to be displayed on the display screen to the display device such as a display device 400" is exemplified.

In addition, the processor 200 may control functions of the image sensor 100 by transmitting control information to the image sensor 100, for example. The processor 200 can also control data to be transmitted from the image sensor 100 by transmitting region designation information to the image sensor 100, for example.

<1-4> Image Sensor 100 (Transmission Device)

The image sensor 100 has an imaging function and a transmission function and transmits data indicating an image generated by image capturing. As described above, the image sensor 100 serves as a transmission device in the communication system 1000.

The image sensor 100 includes "an imaging device such as a digital still camera, a digital video camera, or a stereo camera" or an image sensor device of an arbitrary scheme capable of generating an image, such as "an infrared sensor" and "a distance image sensor" and has a function of transmitting the generated image. The image generated by the image sensor 100 corresponds to data indicating a sensing result of the image sensor 100. An example of a configuration of the image sensor 100 will be described later.

The image sensor 100 transmits data corresponding to a region set in an image (hereinafter referred to as "region data") according to the transmission method according to the embodiment, which will be described later. The control related to the transmission of the region data is performed by a component (which will be described later) that functions as an image processing unit in the image sensor 100, for example. The region set in an image is referred to as a region of interest (ROI) in some cases. Hereinafter, the region set in the image is represented as an "ROI" in some cases.

As the processing related to the setting of a region in the image, arbitrary processing with which it is possible to specify a partial region in the image (or arbitrary processing capable of cutting a partial region from the image) such as "processing of detecting an object in the image and setting a region including the detected object," or "processing of setting a region designated by an operation performed on an arbitrary operation device or the like" is exemplified.

The processing related to the setting of the region in the image may be performed by the image sensor 100 or may be performed by an external device such as the processor 200. In a case in which the image sensor 100 performs the processing related to the setting of the region in the image, the image sensor 100 specifies the region in accordance with a result of the processing related to the setting of the region in the image. Alternatively, in a case in which the processing related to the setting of the region in the image is performed by the external device, for example, the image sensor 100 specifies the region on the basis of region designation information acquired from the external device.

The amount of data related to the transfer becomes smaller than the data amount when the entire image is transferred because the region data, that is, partial data of the image, is transmitted. Accordingly, various advantages achieved by the reduction of the data amount are achieved by the image sensor 100 transmitting the region data, and for example, a transfer time is shortened and a load related to the transfer is reduced in the communication system 1000.

Note that the image sensor 100 can also transmit data indicating the entire image.

In a case in which the image sensor 100 has a function of transmitting region data and a function of transmitting data indicating the entire image, the image sensor 100 can perform the transmission of the region data and the transmission of the data indicating the entire image in a selectively switched manner.

The image sensor 100 transmits the region data or transmits the data indicating the entire image depending on a set operation mode, for example. The setting of the operation mode is performed by an operation performed on an arbitrary operation device, for example.

In addition, the image sensor 100 may selectively switch between the transmission of the region data and the transmission of the data indicating the entire image on the basis of region designation information acquired from an external device. When the region designation information is acquired from the external device, for example, the image sensor 100 transmits the region data of the region corresponding to the region designation information. When the region designation information is not acquired from the external device, the image sensor 100 transmits data indicating the entire image.

The communication system 1000 has the configuration illustrated in FIG. 1, for example. Note that the configuration of the communication system according to the embodiment is not limited to the example illustrated in FIG. 1.

For example, although the image sensor 100 has been exemplified as the device that serves as the transmission device in FIG. 1, a device that serves as the transmission device is not limited to the image sensor 100. For example, in a case in which the communication system according to the embodiment has a configuration that has an image sensor device such as an imaging device and a transmitter that is electrically connected to the image sensor device, the transmitter may serve as the transmission device.

In addition, although the processor 200 has been exemplified as the device that serves as the reception device in FIG. 1, the device that serves as the reception device is not limited to the processor 200. For example, an arbitrary device that has a function of receiving data can serve as the reception device in the communication system according to the embodiment.

In addition, the communication system according to the embodiment may not have the memory 300 in a case in which the image transmitted from the image sensor 100 is stored in a recording medium outside the communication system, in a case in which the image transmitted from the image sensor 100 is stored in a memory provided in the processor 200, in a case in which the image transmitted from the image sensor 100 is not recorded, or the like.

In addition, the communication system according to the embodiment can employ a configuration in which the communication system does not have the display device 400 illustrated in FIG. 1.

Further, the communication system according to the embodiment may have an arbitrary configuration in accordance with functions of an electronic device to which the communication system according to the embodiment is applied as will be described later.

<2> Application Example of Communication System According to Embodiment

Although the communication system has been described above as an example in the embodiment, the embodiment is not limited to such an example. The embodiment can be applied to various electronic devices such as a communication device such as a smartphone, a drone (equipment capable of performing operations through remote operations or autonomous operations), a moving body such as a vehicle, a computer such as a personal computer (PC), a tablet-type device, and a game console.

<3> Transmission Method According to Embodiment

Next, the transmission method according to the embodiment will be described. Hereinafter, a case in which the transmission method according to the embodiment is applied to the image sensor 100 (the transmission device according to the embodiment) illustrated in FIG. 1 will be described as an example. The processing related to the transmission method according to the embodiment is performed by an IC chip (which will be described later) that functions as an image processing unit, for example, in the image sensor 100. Note that the processing related to the transmission method according to the embodiment may be performed by another component that functions as an image processing unit in the image sensor 100.

FIG. 5 is an explanatory diagram illustrating an example of regions set in the image. FIG. 5 illustrates four regions, namely a region 1, a region 2, a region 3, and a region 4 as an example of the regions. Note that it is needless to say that the region set in the image is not limited to the example illustrated in FIG. 5.

As described above, it is possible to transfer data in a rectangular region such as the region 1 in FIG. 5 in a case in which the existing technique is used.

However, it is difficult to transfer data in a region with an arbitrary shape other than the rectangular shape set in the image, such as the region 2, the region 3, and the region 4 in FIG. 5 even if the existing technology is used as described above. In addition, in a case in which a plurality of regions are set in a row, such as the region 1 and the region 2 in FIG. 5, and in a case in which the set regions are overlaid, such as the region 3 and the region 4 in FIG. 5, it is difficult to transfer data in the region even if the existing technology is used. Here, the row in the image means that the y coordinates are the same when the positions of the pixels are represented by a two-dimensional plane coordinates (x, y).

<3-1> Basic Processing

Thus, the image sensor 100 sets region information corresponding to the region set in the image for each row in the image.

Then, the image sensor 100 causes the set region information and the region data corresponding to the region to be transmitted for each row. The image sensor 100 causes the region information and the region data for each row to be transmitted in accordance with a predetermined order, such as an ascending order a descending order of the values of the y coordinates, for example. In addition, the image sensor 100 may cause the region information and the region data for each row to be transmitted in a random order.

The region information according to the embodiment is data (data group) for specifying, on the side of the reception device, the region set in the image. The region information includes, for example, information indicating the position of the row, identification information of the region included in the row, information indicating the position of a column of the region included in the row, and information indicating the size of the region included in the row.

Note that the information included in the region information can change depending on a transmission scheme, which will be described later. For example, one or both of the identification information of the region included in the row and the information indicating the size of the region included in the row may not be included in a second transmission scheme and a third transmission scheme, which will be described later. In a case in which the region is divided by using a VC number, for example, the VC number may serve as the identification information of the region included in the row according to the second transmission scheme and the third transmission scheme, which will be described later. In addition, in the case in which the region is divided by using the VC number, it is possible to use the payload length instead as the information indicating the size of the region included in the row according to the second transmission scheme and the third transmission scheme, which will be described later. Hereinafter, "a case in which the region information includes the information indicating the position of the row, the identification information of the region included in the row, the information indicating the position of the column of the region included in the row, and the information indicating the size of the region included in the row" will be exemplified.

As the information indicating the position of a row, arbitrary data with which it is possible to specify a row, such as data indicating a number of a y coordinate or data indicating a value of a y coordinate calculated by incrementing an initial value (for example, "0 (zero)" is exemplified. Hereinafter, the information indicating the position of the row will be referred to as "Y" in some cases.

As the identification information of a region, arbitrary data with which it is possible to uniquely specify the region, such as data indicating an ID of a region such as a number applied to the region is exemplified. Hereinafter, the identification information of the region will be referred to as "ROI ID" or "I" in some cases.

As the information indicating the position of a column of the region, arbitrary data with which it is possible to specify the column, such as data indicating a number of an x coordinate, is exemplified. Hereinafter, the information indicating the position of the column in the region will be referred to as "ROI X" or "X" in some cases.

As the information indicating the size of a region, arbitrary data with which it is possible to specify the size of the region in the row, such as data indicating the number of pixels in the region at the row is exemplified. Hereinafter, the size of the region at the row will be referred to as the "ROI length" "ROI LEN", or "L" in some cases.

The reception device that has received the region information by the information indicating the position of the row, the identification information of the region, the information indicating the position of the column of the region, and the information indicating the size of the region being set in the region information as described above, for example, can perform specification of the region, specification of the position of the region, and specification of the ROI length. In addition, it is possible to uniquely specify at which position and with which ROI length the region has been set in the row by the specification of the region, the specification of the position of the region, and the specification of the RIO length being performed.

Accordingly, the communication system 1000 can be respectively compatible with the transfer of "region data in the rectangular region, such as the region 1 in FIG. 5" and "region data in regions with arbitrary shapes other than the rectangular shape, such as the region 2, the region 3, and the region 4 in FIG. 5" by the information indicating the position of the row, the identification information of the region, the information indicating the position of the column of the region, and the information indicating the size of the region being set in the region information.

In addition, the image sensor 100 may collectively set, in the region information, the information to be included in the region information for each region included in the row. The image sensor 100 collectively sets, in the region information, the identification information of the region, the information indicating the position of the column of the region, and the information indicating the size of the region, for example, for each region included in the row. The collective setting of the region information for each region means setting of the identification information of the region, the information indicating the position of the column of the region, and the information indicating the size of the region, for example (an example of the information included in the region information) as a group of data in the region information.

Here, since the image sensor 100 sets the region information for each row, the position of the row is constant even if a plurality of regions are included. Therefore, the image sensor 100 sets one piece of information indicating the position of the row in the region information. Note that it is needless to say that the image sensor 100 can collectively set the information indicating the position of the row, the identification information of the region, the information indicating the position of the column of the region, and the information indicating the size of the region for each region included in the row.

For example, the reception device that has received the region information can more easily perform the specification of the region, the specification of the position of the region, and the specification of the ROI length for each region by the identification information of the region, the information indicating the position of the column of the region, and the information indicating the size of the region being collectively set for each region included in the row as described above. In addition, it is possible to uniquely specify which region has been set at which position with which ROI length in the row by the specification of the region, the specification of the position of the region, and the specification of the ROI length being performed.

Therefore, the communication system 1000 can address "the transfer of the region data in the case in which a plurality of regions are set in one row, such as the region 1 and the region 2 in FIG. 5" and "the transfer of the region data in the case in which the set regions are overlaid, such as the region 3 and the region 4 in FIG. 5" by the identification information of the region, the information indicating the position of the column of the region, and the information indicating the size of the region being collectively set for each region included in the row.

In addition, a plurality of same regions can be present in one row depending on a set region, as illustrated as the region 2 in FIG. 5, for example. Thus, in the case in which the plurality of same regions are present in one row, the image sensor 100 may set the region information corresponding to the number of the same regions. In the case in which the plurality of same regions are present in one row, the image sensor 100 sets the identification information of the region, the information indicting the position of the column of the region, and the information indicating the size of the region corresponding to the number of the present regions, for example, in the region information.

The reception device that has received the region information can perform the specification of the region, the specification of the position of the region, and the specification of the ROI length for each of the plurality of same regions by the identification information of the region, the information indicating the position of the column of the region, and the information indicating the size of the region corresponding to the number of the same regions that are present in one row being set in the region information, for example.

Therefore, the communication system 1000 can address the transfer of the region data in the region 2 in FIG. 5 by the region information corresponding to the number of the plurality of same regions that are present in one row being set in the region information.

Therefore, the reception device that has received the region information can uniquely specify the region set in the row by the region information that includes various kinds of information as described above, for example, being set for each row.

Note that the information included in the region information is not limited to the example described above. For example, the region information may include other data such as data indicating the number of regions included in the row (hereinafter, referred to as "Num of ROI" in some cases) and the like. Specific examples of the information included in the region information will be described later.

<3-2> Exception Processing

Note that the processing related to the transmission method according to the embodiment is not limited to the above basic processing.

(a) First Example of Exception Processing

For example, the image sensor 100 may not set, in the region information, information that does not change from the information included in the region information in a row that is caused to be transmitted immediately before, in the information included in the region information. That is, the image sensor 100 causes the region information, which includes information that has changed from the row from which the region information is caused to be transmitted immediately before, to be transmitted.

It is possible to cause the data amount of the region information to be further reduced by the information, which has not changed from the information included in the region information in the row to be caused to be transmitted immediately before, being not transmitted as described above. The reduction of the data amount of the region information contributes to shortening of a transfer time and reduction of a load related to the transfer in the communication system 1000.

Note that there may be information set in the region information in accordance with a change in other information even if the information does not change from the information included in the region information in the row that is caused to be transmitted immediately before.

For example, the image sensor 100 sets the identification information of the region in the region information when the information indicating the position of the column of the region is set in the region information. In addition, the image sensor 100 sets the identification information of the region in the region information when the information indicating the size of the region is set in the region information. That is, the image sensor 100 sets the identification information of the region in the region information in a case in which one or both the x coordinate and the ROI length of the region are changed from the content included in the region information in the row that is caused to be transmitted immediately before.

The reception device that has received the region information can uniquely specify the region corresponding to the content of the change by the image sensor 100 setting the identification information of the region in the region information in a case in which one of or both the x coordinate and the ROI length of the region are changed.

(b) Second Example of Exception Processing

As described above, the image sensor 100 can cause the region information and the region data for each row to be transmitted in a predetermined order. In a case in which the row from which the region information and the region data are caused to be transmitted is the row in accordance with the predetermined order at this time, the image sensor 100 may not set the information indicating the position of the row in the region information.

The reception device can specify in which row the received region information and region data are included, by following the predetermined order even in a case in which the image sensor 100 does not set the information indicating the position of the row in the region information.

<3-3> Transmission Scheme of Region Information and Region Data

The image sensor 100 transmits the region information and the region data for each row by performing the basis processing described in "above <3-1>" or "the basis processing described in "above <3-1> and the exception processing described in above <3-2>". Next, the transmission scheme in which the region information and the region data are transmitted will be described.

As the transmission scheme of the region information and the region data, a first transmission scheme described in (1) below, a second transmission scheme described in (2) below, and a third transmission scheme described in (3) below are exemplified.

(1) First Transmission Scheme (1-1) Processing Related to First Transmission Scheme The image sensor 100 stores the region information and the region data in a payload of a packet and causes the region information and the region data to be transmitted for each row.

FIG. 6 is an explanatory diagram illustrating an example of data that is transmitted in a first transmission scheme related to the transmission method according to the embodiment. FIG. 6 illustrates "an example in which the region information and the region data respectively corresponding to the region 1, the region 2, the region 3, and the region 4 illustrated in FIG. 5 are stored in a payload of a long packet of MIPI illustrated in FIG. 3 and are transmitted for each row".

"FS" illustrated in FIG. 6 represents a frame start (FS) packet in accordance with the MIPI CSI-2 standard, and "FE" illustrated in FIG. 6 is a frame end (FE) packet in accordance with the MIPI CSI-2 standards (the same applies to the other diagrams).

"Embedded Data" illustrated in FIG. 6 is data that can be embedded in a header or a footer of the data to be transmitted. As "Embedded Data", additional information that is additionally transmitted by the image sensor 100 is exemplified. Hereinafter, Embedded Data will be referred to as "EBD" in some cases.

As the additional information according to the embodiment, one or two or more of information indicating the data amount of the region, information indicating the size of the region, and information indicating priority of the region are exemplified.

As the information indicating the data amount of the region, data in an arbitrary form with which it is possible to specify the data amount of the region such as "the number of pixels included in the region (or the data amount of the region) and data indicating the data amount of the header" is exemplified. The reception device can specify the data amount of each region by the information indicating the data amount of the region being transmitted as "Embedded Data" illustrated in FIG. 6. That is, it is possible to cause the reception device to specify the data amount of the region even in a case in which the reception device does not have a function of calculating the data amount of each region on the basis of the region information, by the information indicating the data amount of the region being transmitted as "Embedded Data" illustrated in FIG. 6.

As the information indicating the size of the region, data in an arbitrary form with which it is possible to specify the size of the region, such as "the data indicating the rectangular region including the region (for example, data indicating the number of pixels in the horizontal direction and the number of pixels in the vertical direction in the rectangular region) is exemplified.

The information indicating priority of regions is data used in processing of region data, for example. In one example, the priority indicated by the information indicating priority of regions is utilized for an order in which the regions are processed, in processing performed in a case in which the set regions are overlaid such as the region 3 and the region 4 in FIG. 5, and the like.

Note that the additional information according to the embodiment is not limited to the example described above. As the additional information according to the embodiment, various kinds of data such as exposure information indicating an exposure value or the like of the image sensor device and gain information indicating a gain of the image sensor device are exemplified. Each of the exposure value indicated by the exposure information and the gain indicated by the gain information is set in the image sensor device under control performed by the processor 200 via the control bus B2.

FIG. 7 is an explanatory diagram for describing an example of Embedded Data transmitted according to the first transmission scheme related to the transmission method according to the embodiment. FIG. 7 illustrates an example in which the information indicating the size of the region is transmitted as "Embedded Data" illustrated in FIG. 6" and the transmitted information indicating the size of the region is data indicating a minimum rectangular region including the region. In addition, FIG. 7 illustrates an example in which four regions, namely the region 1, the region 2, the region 3, and the region 4 have been set similarly to FIG. 5.

The reception device can specify the minimum rectangular region including the region 1 illustrated as R1 in FIG. 7, the minimum rectangular region including the region 2 illustrated as R2 in FIG. 7, the minimum rectangular region including the region 3 illustrated as R3 in FIG. 7, and the minimum rectangular region including the region 4 illustrated as R4 in FIG. 7 by the information indicating the size of the region being transmitted as "Embedded Data" illustrated in FIG. 6. That is, it is possible to cause the reception device to specify the minimum rectangular region including each region on the basis of the region information even in the case in which the reception device does not have a function of specifying the minimum rectangular region including each region on the basis of the region information, by the information indicating the size of the region being transmitted as "Embedded Data" illustrated in FIG. 6. Note that it is needless to say that the information indicating the size of the region is not limited to the data indicating the minimum rectangular region including each region.

As the information indicating the priority of regions, data in an arbitrary form with which it is possible to specify priority of regions such as data in which ROI IDs are aligned in an order from the highest priority or data in which ROI IDs are aligned in an order from the lowest priority is exemplified. The reception device can specify the processing order of the regions or which region is to be processed with priority, for example, by the information indicating the priority of the regions being transmitted as "Embedded Data" illustrated in FIG. 6. That is, it is possible to control the processing performed by the reception device on the regions by the information indicating the priority of the regions being transmitted as "Embedded Data" illustrated in FIG. 6.

Note that it is needless to say that the respective examples of the information indicating the data amount of the region, the information indicating the size of the region, and the information indicating the priority of the region transmitted as "Embedded Data" illustrated in FIG. 6 are not limited to the examples described above.

"PH" illustrated in FIG. 6 is a packet header of a long packet. Here, the packet header of the long packet related to the first transmission scheme may also function as data (change information) indicating whether or not the information included in the region information has changed from the region information included in a packet that is caused to be transmitted immediately before. That is, it is possible to state that "PH" illustrated in FIG. 6 is data indicating a data type of the long packet.

In one example, the image sensor 100 sets "0x38" in "PH" in a case in which the information included in the region information has changed from the region information included in the packet that is caused to be transmitted immediately before. In this case, the image sensor 100 stores the region information in the payload of the long packet.

In another example, the image sensor 100 sets "0x39" in "PH" in a case in which the information included in the region information has not changed from the region information included in the packet that is caused to be transmitted immediately before. In this case, the image sensor 100 does not store the region information in the payload of the long packet. That is, in the case in which the information included in the region information has not changed from the region information included in the packet that is caused to be transmitted immediately before, the image sensor 100 does not transmit the region information.

Note that it is needless to say that the data set in "PH" is not limited to the examples described above.

"Info" illustrated in FIG. 6 is region information stored in the payload (the same applies to the other diagrams). As illustrated in FIG. 6, the region information is stored in the head portion of the payload. Hereinafter, region information will be referred to as "ROI Info" in some cases.

Each of "1", "2", "3", and "4" illustrated in FIG. 6 corresponds to the region data of the region 1, the region data of the region 2, the region data of the region 3, and the region data of the region 4 that are stored in the payload (the same applies to the other drawings). Note that although the respective pieces of region data are illustrated in a divided manner in FIG. 6, this represents the division for convenience, and there is no division in the data to be stored in the payload (the same applies to the other drawings). Hereinafter, the region data will be referred to as "ROI DATA" in some cases.

FIG. 8 is an explanatory diagram illustrating an example of a configuration of a long packet transmitted according to the first transmission scheme related to the transmission method according to the embodiment.

"ROI Info Type" illustrated in FIG. 8 is data indicating a transfer scheme of "ROI Info Parameter". The reception device that has received the region information can uniquely specify the content of "ROI Ingo Parameter" by "ROI Info Type" being set.

In addition, "ROI Info Type" corresponds to other data indicating a data type of the long packet. That is, for the long packet related to the first transmission scheme, two items, namely "PH" and "ROI Info Type" are defined as data types of the long packet.

"ROI Info Type" is 1-byte data, for example, and has the following meaning when represented by Verilog-HDL description. Note that it is needless to say that "ROI Info Type" is not limited to 1-byte data.

[7: 4] . . . Reserved.
[3] . . . [1'b1]: Y is transferred, [1'b0]: Y is not transferred.
[2] . . . [1'b1]: ROI ID is transferred, [1'b0]: ROI ID is not transferred.
[1] . . . [1'b1]: X is transferred, [1'b0]: X is not transferred
[0] . . . [1'b1]: The ROI length is transferred, [1'b0]: The ROI length is not transferred.

In addition, data in accordance with "ROI Info Type" is stored in "ROI Info Parameter" illustrated in FIG. 8.

Note that the region information related to the first transmission scheme may include a flag (hereinafter, referred as "NO CHANGE flag") indicating that both the x coordinate and the ROI length of the region have not changed from the region information included in the packet that is caused to be transmitted immediately before, for example. In a case in which the NO CHANGE flag indicates that there has been no change (for example, in a case in which the NO CHANGE flag is 1'b1), [1] and [0] described above of "ROI Info Type" may be omitted.

As the NO CHANGE flag, a most significant bit (MSB) of the ROI ID is exemplified. Note that the NO CHANGE flag may be data that is separate from the ROI ID.

FIG. 9 is an explanatory diagram illustrating an example of data transmitted according to the first transmission scheme related to the transmission method according to the embodiment and is a diagram specifically illustrating the data illustrated in FIG. 6 in accordance with the configuration of the long packet illustrated in FIG. 8.

In the first transmission scheme, the region information and the region data corresponding to each of the region 1, the region 2, the region 3, and the region 4 illustrated in FIG. 5 are stored in the payload of the long packet of MIPI as illustrated in FIG. 9, for example, and are transmitted for each row.

As described above, the image sensor 100 can transmit, as Embedded Data" illustrated in FIG. 6, one or two or more of the information indicating the data amount of the region, the information indicating the size of the region, and the information indicating the priority of the region (one example of the additional information).

(1-2) Features and Advantages of First Transmission Scheme

The first transmission scheme related to the transmission method according to the embodiment has features described below, for example. Note that it is needless to say that the features that the first transmission scheme related to the transmission method according to the embodiment has are not limited to the examples described below.

The additional information is transmitted by EBD, and the region information corresponding to the set region is transmitted by the payload.

Only the information corresponding to a change point in the information included in the region information is transmitted.

It is possible to address any region with an arbitrary shape.

In addition, the region information that is stored in the head portion of the payload and is then transmitted has the features as described below, for example, in the first transmission scheme. Note that it is needless to say that the features that the region information related to the first transmission scheme has are not limited to the examples described below.

Two data types of the long packet are defined for region transfer.
   One of the data types is used when region information is transferred (for example, data indicating "0x38").
   The other is used in a case in which the region information is the same as region information included in a packet that is caused to be transmitted immediately before (for example, data indicating "0x39").
Since there is no division unlike the short packet related to the second transmission scheme, which will be described later, a parameter transfer format is transmitted.
In a case in which a plurality of same regions are present in one row, information of the plurality of same regions that are present in a row is transferred by transmitting identification information of the same regions corresponding to the number of the present regions.
Information indicating the position of the row (Y).
   Incremented by an initial value 0 (zero).
   Transmitted when the transmission does not follow a predetermined order (for example, thinning-out is performed).
NO CHANGE flag.
   Perform transmission by utilizing MSB of identification information (ROI ID) of the region.
Identification information (I) of the region.
   Transmitted when the region increases or decreases.
   Transmitted in a case in which position of the column and the OI length of the region are changed.
Information (X) indicating the position of the column of the region.
   Initial value 0 (zero).
   Transmitted when some change is made.
   Transmitted along with identification information of the region as a set.
Information (L) indicating the size of the region.
   Never fail to set for a row that is transmitted first.
   transmitted when some change is made.
   Transmitted along with the identification information of the region as a set In addition, the first transmission scheme has the advantages described below, for example.
Transmission efficiency is high.
There is backward compatibility with the CSI-2 standards that have already been defined.
It is possible to transfer any region (ROI) with an arbitrary shape.

(1-3) Configuration Example Related to First Transmission Scheme

Next, an example of a configuration of the image sensor 100 that is compatible with the aforementioned first transmission scheme and an example of a configuration of the processor 200 that is compatible with the first transmission scheme (an example of a configuration related to processing of the data transmitted from the image sensor 100) will be described.

(1-3-1) Configuration of Image Sensor 100 (Transmission Device) that is Compatible with First Transmission Scheme FIG. 10 is a hardware block diagram illustrating an example of a configuration of the image sensor 100 that is compatible with the first transmission scheme related to the transmission method according to the embodiment. The image sensor 100 includes an image sensor device 102 and an IC chip 104, for example. The image sensor 100 illustrated in FIG. 10 operates using electrical power supplied from an internal power source (not illustrated) that is included in the communication system 1000, such as a battery, or electrical power supplied from an external power source of the communication system 1000.

The image sensor device 102 is "an imaging device such as a digital still camera" or an image sensor device of an arbitrary scheme capable of generating an image, such as an "infrared sensor" or a "distance image sensor".

In one example, the imaging device that functions as the image sensor device 102 includes lens/imaging elements and a signal processing circuit.

The lens/imaging elements include for example, an optical system lens and an image sensor using a plurality of imaging elements such as complementary metal oxide semiconductors (CMOSs) or charge coupled devices (CCDs).

The signal processing circuit includes an automatic gain control (AGC) circuit or an analog to digital converter (ADC), for example, and converts an analog signal generated by the imaging elements into a digital signal (image data). In addition, the signal processing circuit performs various kinds of processing related to RAW development, for example. Further, the signal processing circuit may perform various kinds of signal processing such as white balance correction processing, color tone correction processing, gamma correction processing, YCbCr conversion processing, and edge emphasis processing, for example.

In addition, the signal processing circuit may perform processing related to setting of a region in the image and deliver the region designation information to the IC chip 104. Further, the signal processing circuit may deliver a variety of kinds of data such as exposure information and gain information to the IC chip 104.

The signal indicating the image generated by the image sensor device 102 is delivered to the IC chip 104. Note that in a case in which the signal indicating the image to be delivered from the image sensor device 102 to the IC chip 104 is an analog signal, the IC chip 104 converts the analog signal to a digital signal by using an ADC provided therein and processes the image data obtained by the conversion, for example. Hereinafter, a case in which image data is delivered from the image sensor device 102 to the IC chip 104 will be described as an example.

The IC chip 104 is an integrated circuit (IC) with a circuit related to a function of transmitting data according to the first transmission scheme formed into a chip shape, processes the image data delivered from the image sensor device 102, and transmits data corresponding to the generated image. The data corresponding to the image is image data (that is, data indicating the entire image) delivered from the image sensor device 102 or region information and region data. Note that the circuit related to the function of transmitting data according to the first transmission scheme is not limited to implementation in the form of one IC chip and may be formed of a plurality of IC chips.

The IC chip 104 includes, for example, an image processing circuit 106, a LINK control circuit 108, an ECC generation circuit 110, a PH generation circuit 112, an EBD buffer 114, an image data buffer 116, a synthesis circuit 118, and a transmission circuit 120.

The image processing circuit 106 is a circuit that has a function of performing processing related to the transmission method according to the embodiment. In a case in which the processing related to the transmission method according to the embodiment is performed, the image processing circuit 106 sets region information for each row in the image, and causes the LINK control circuit 108, the ECC generation circuit 110, the PH generation circuit 112, the EBD buffer 114, the image data buffer 116, the synthesis circuit 118, and the transmission circuit 120 to transmit the set region information and the region data corresponding to the region according to the first transmission scheme. In addition, the image processing circuit 106 also can cause the image data delivered from the image sensor device 102 (that is, data indicating the entire image) to be transmitted for each row.

As the image processing circuit 106, a processor such as an MPU is exemplified.

Functions that the image processing circuit 106 has will be described separately for functional blocks. As illustrated in FIG. 10, the image processing circuit 106 has a region cutting unit 122, an image processing control unit 124, and an encoding unit 126, for example.

The region cutting unit 122 plays a role in performing processing related to setting of a region in the image and sets the region (ROI) in the image indicated by the image data delivered from the image sensor device 102. The region cutting unit 122 performs processing related to setting of the region in the image in accordance with a set operation mode, for example. In a case in which the operation mode is an operation mode in which the region data is transmitted, for example, the region cutting unit 122 performs the processing related to the setting of the region in the image. In addition, in a case in which the operation mode is an operation mode in which the data indicating the entire image is transmitted, the region cutting unit 122 does not perform the processing related to the setting of the region in the image.

The region cutting unit 122 detects an object by performing arbitrary object detection processing on the image, for example, and sets a region including the detected object for each detected object. In addition, the region cutting unit 122 may set a region designated through an operation performed on an arbitrary operation device or the like. As the region set by the region cutting unit 122, a rectangular region as illustrated as the region 1 in FIG. 5 and regions with arbitrary shapes other than the rectangular shape set in the image, such as the region 2, the region 3, and the region 4 in FIG. 5, can be included.

In a case in which the region has been set, the region cutting unit 122 delivers the region designation information indicating the set region to the image processing control unit 124, for example. In addition, in a case in which the region has not been set, the region cutting unit 122 does not deliver the region designation information to the image processing control unit 124.

In addition, the region cutting unit 122 delivers the image data, which has been delivered from the image sensor device 102, to the encoding unit 126.

The image processing control unit 124 plays a role in performing the processing related to the transmission method according to the embodiment, sets the region information for each row in the image, and delivers the set region information to the encoding unit 126 and the PH generation circuit 112.

The image processing control unit 124 specifies the region included in each row in the image on the basis of the region designation information acquired from the region cutting unit 122 and the region designation information (not illustrated) acquired form an external device, for example. Then, the image processing control unit 124 sets the region information for each row on the basis of the specified region. At this time, the image processing control unit 124 may not set the information, which has not changed from the information included in the region information in the row that is caused to be transmitted immediately before, in the region information as described above as the exception processing.

In addition, in a case in which the region designation information has not been acquired, the image processing control unit 124 does not set the region information.

Note that the processing performed by the image processing control unit 124 is not limited to the examples described above.

For example, the image processing control unit 124 may generate frame information, for example, and deliver the generated frame information to the LINK control circuit 108. As the frame information, a VC number applied to each frame is exemplified. In addition, the frame information may include data indicating a data type such as YUV data, RGB data, or RAW data.

In addition, the image processing control unit 124 may perform processing of setting the additional information and deliver the set additional information to the EBD buffer 114.

As the processing of setting the additional information, processing of generating the additional information is exemplified. As the processing of generating the additional information, one or two or more of processing of generating information indicating the data amount of the region, processing of generating information indicating the size of the region, and processing of generating information indicating priority of the region are exemplified.

Note that the processing of setting the additional information is not limited to the processing of generating the additional information. For example, the image processing control unit 124 may set, as the additional information, information acquired from the image sensor device 102 such as the exposure information and the gain information. In addition, the image processing control unit 124 may set, as the additional information, a variety of data items related to the region, such as data indicating a physical region length, data indicating an output region length, data indicating an image format, and data indicating the total data amount, for example. As the physical region length, the number of pixels of the image sensor device 102 is exemplified. As the output region length, the number of pixels (the length on the image) of the image output from the image sensor device 102 is exemplified.

The encoding unit 126 encodes the image data delivered from the image sensor device 102 in a predetermined scheme such as a scheme that is compatible with Joint Photographic Experts Group (JPEG), for example.

In a case in which the region information has not been acquired from the image processing control unit 124, the encoding unit 126 delivers the encoded image data to the image data buffer 116. Hereinafter, the encoded image data, that is, the data indicating the entire encoded image will be referred to as "ordinary data" in some cases.

In addition, in a case in which the region information is acquired from the image processing control unit 124, the encoding unit 126 delivers the acquired region information and the encoded region data corresponding to the region to the image data buffer 116.

The image processing circuit 106 performs processing related to the transmission method according to the embodiment by having the region cutting unit 122, the image processing control unit 124, and the encoding unit 126. Note that the functional blocks of the image processing circuit 106 illustrated in FIG. 10 are obtained by dividing the functions that the image processing circuit 106 has for convenience, and the dividing of the functions of the image processing circuit 106 is not limited to the example illustrated in FIG. 10.

The LINK control circuit 108 delivers the frame information to the ECC generation circuit 110, the PH generation circuit 112, and the synthesis circuit 118 for each row, for example.

The ECC generation circuit 110 sets an error correction code for each row. The ECC generation circuit 110 generates an error correction code of one row in the frame information (for example, the VC number, the data type, or the like) on the basis of data of the row. The ECC generation circuit 110 delivers the generated error correction code to the PH generation circuit 112 and the synthesis circuit 118, for example. In addition, the ECC generation circuit 110 may generate the error correction code in conjunction with the PH generation circuit 112.

The PH generation circuit 112 generates a packet header for each row by using the frame information.

The PH generation circuit 112 may generate the packet header on the basis of the region information delivered from the image processing circuit 106 (the image processing control unit 124 in the example in FIG. 10). Specifically, the PH generation circuit 112 sets "the data indicating whether or not the information included in the region information has changed from the region information included in the packet that is caused to be transmitted immediately before" (change information) as described above in the packet header on the basis of the region information.

The EBD buffer 114 is a buffer that temporarily holds the additional information delivered from the image processing circuit 106 (the image processing control unit 124 in the example in FIG. 10). The EBD buffer 114 outputs the additional information as "Embedded Data" to the synthesis circuit 118 at a predetermined timing. Note that "Embedded Data" output from the EBD buffer 114 may be delivered to the synthesis circuit 118 via the image data buffer 116, which will be described later.

The image data buffer 116 is a buffer that temporarily hold data (the ordinary data or the region information and the region data) delivered from the image processing circuit 106 (the encoding unit 126 in the example in FIG. 10). The image data buffer 116 outputs the held data to the synthesis circuit 118 for each row at a predetermined timing.

The synthesis circuit 118 generates a packet to be transferred on the basis of data respectively acquired from the ECC generation circuit 110, the PH generation circuit 112, the EBD buffer 114, and the image data buffer 116, for example.

The transmission circuit 120 transmits the packet delivered from the synthesis circuit 118 via the data bus B1 for each row (an example of a signal transfer path; the same applies to the following description). For example, the transmission circuit 120 transmits the packet by a high-speed differential signal as illustrated in FIG. 4.

In a case in which the region 1, the region 2, the region 3, and the region 4 illustrated in FIG. 5 are set, for example, the transmission circuit 120 transmits the set region information and the region data corresponding to the region in a long packet for each row as illustrated in FIG. 9.

In addition, in a case in which no region is set, that is, in a case in which ordinary data is output from the image data buffer 116, the transmission circuit 120 transmits the long packet in which the data corresponding to each row is stored in the payload, for each row. Note that the transmission circuit 120 can transmit the additional information as "Embedded Data" even in this case.

The image sensor 100 corresponding to the first transmission scheme has a hardware configuration illustrated in FIG. 10, for example. Note that it is needless to say that the hardware configuration of the image sensor 100 corresponding to the first transmission scheme is not limited to the example illustrated in FIG. 10.

(1-3-2) Configuration of Processor 200 (Reception Device) that is Compatible with First Transmission Scheme FIG. 11 is a functional block diagram illustrating an example of a configuration of the processor 200 that is compatible with the first transmission scheme related to the transmission method according to the embodiment. The processor 200 has a header separation unit 202, a header interpretation unit 204, a payload separation unit 206, an image processing unit 208, and a transmission unit 210, for example.

The header separation unit 202 separates header data corresponding to the header portion and payload data corresponding to the payload portion from the received data. The header separation unit 202 separates the header data from the received data in accordance with a rule defined in advance by standards or the like, for example. In addition, the header separation unit 202 may separate the payload data from the received data in accordance with the rule defined in advance by standards or the like or may separate the payload data from the received data on the basis of a result of processing performed by the header interpretation unit 204, for example.

The header interpretation unit 204 interprets content indicated by the header data.

In one example, the header interpretation unit 204 interprets that the information included in the region information has changed from the region information included in the packet that is caused to be transmitted immediately before in a case in which the header data indicates "0x38", for example. In addition, the header interpretation unit 204 may interpret that the region information is included in the payload data in this case.

In another example, the header interpretation unit 204 interprets that the information included in the region information has not changed from the region information included in the packet that is caused to be transmitted immediately before in a case in which the header data indicates "0x39", for example. In addition, the header interpretation unit 204 may interpret that the region information is not included in the payload data in this case.

Note that the example of the processing performed by the header interpretation unit 204 is not limited to the example described above. For example, the header interpretation unit 204 may specify the position of the payload data and deliver the specified position to the header separation unit 202. In addition, the header interpretation unit 204 can also interpret whether or not the payload data is "Embedded Data".

The payload separation unit 206 separates the additional information, the region information, and the image data (the ordinary data or the region data; the same applies to the description of FIG. 11 below) from the payload data on the basis of the result of the interpretation performed by the header interpretation unit 204

For example, in a case in which the header interpretation unit 204 determines that the payload data is "Embedded Data", the payload separation unit 206 regards the payload data as the additional information.

In addition, in a case in which the header interpretation unit 204 does not interpret that the payload data is "Embedded Data", the payload separation unit 206 separates the region information and the image data from the payload data. As described above with reference to FIGS. 6, 8, and 9, for example, the region information and the region data are stored in the payload while the region information is stored in the head portion of the payload. In addition, in the case in which the ordinary data is transmitted from the image sensor 100, the region information is not stored in the payload. Accordingly, the payload separation unit 206 can separate the region information and the image data by processing the payload from the head portion.

The image processing unit 208 processes the image data for each row on the basis of the additional information, the region information, and the image data delivered from the payload separation unit 206 and obtains data indicating the image corresponding to the region or the data indicating the entire image.

The image processing unit 208 may determine whether or not the data acquired via the data bus B1 is data indicating the image corresponding to the region or data indicating the entire image on the basis of the information delivered from the payload separation unit 206, for example, and perform processing in a processing mode in accordance with the result of the determination.

In a case in which the region information is delivered when the processing targeted at an image of a certain frame is performed for the first time (that is, when the processing corresponding to the first row is performed), for example, the image processing unit 208 determines that the data acquired via the data bus B1 is data indicating the image corresponding to the region. Then, the image processing unit 208 proceeds to the processing mode in which the region data is processed and obtains data indicating the image corresponding to the region on the basis of the region information and the region data for each row.

In a case in which the region information is not delivered when the processing targeted at the image of a certain frame is performed for the first time, for example, the image processing unit 208 determines that the data acquired via the data bus B1 is data indicating the entire image. Then, the image processing unit 208 proceeds to the ordinary processing mode (the processing mode in which the ordinary data is processed) and obtains the data indicating the entire image on the basis of the ordinary data for each row.

Note that the method of determining the data acquired via the data bus B1 is not limited to the example described above. For example, the image processing unit 208 may determine that the data acquired via the data bus B1 is data indicating the image corresponding to the region in a case in which the information related to the region (for example, one or two or more of the information indicating the data amount of the region, the information indicating the size of the region, and the information indicating priority of the region).

The image processing unit 208 has a decoding unit 212 and an image generation unit 214, for example.

The decoding unit 212 decodes the image data by a predetermined scheme corresponding to the encoding performed by the image sensor 100, for example. At this time, the decoding unit 212 may change content of the processing on the basis of the additional information.

The image generation unit 214 generates the data indicating the image corresponding to the region or the data indicating the entire image from the image data for each row decoded by the decoding unit 212 on the basis of the region information.

In a case in which the region information is delivered when the processing targeted at the image of a certain frame is performed for the first time, for example, the image generation unit 214 determines that the image data delivered from the decoding unit 212 is region data. Then, in a case in which it is determined that the image data is the region data, the image generation unit 214 divides the region data for each row into the data for each region on the basis of the region information. Here, the region information that the image generation unit 214 uses for the processing can include the region information corresponding to the row as a target of the processing and region information corresponding to a row for which the processing has already been performed.

Here, since the region information basically includes the information indicating the position of the row, the identification information of the region included in the row, the information indicating the position of the column of the region included in the row, and the information indicating the size of the region included in the row, the image generation unit 214 can uniquely specify the region data included in each row. Accordingly, the image generation unit 214 can generate the data indicating the image corresponding to the region set in the image of a certain frame, for each region.

In addition, in a case in which the region information is not delivered when the processing targeted at the image of a certain frame is performed for the first time, the image generation unit 214 determines that the delivered image data is ordinary data.

In a case in which the image data is determined to be ordinary data, the image generation unit 214 generates data indicating the entire image from the image data for each row delivered from the decoding unit 212.

The image processing unit 208 obtains the data indicating the image corresponding to the region or the data indicating the entire image by being provided with the decoding unit 212 and the image generation unit 214, for example.

Note that the processing performed by the image processing unit 208 is not limited to the example described above. For example, the image processing unit 208 can perform a variety of kinds of processing such as processing related to control of recording of image data in a recording medium such as the memory 300, processing related to control of display of an image on a display screen of the display device 400, and processing related to setting of a region in an image, for example, as described above.

The transmission unit 210 transmits various kinds of data (for example, image data, control information, and the like) to an external device via the control bus B2, various signal lines, and the like. As the transmission unit 210, communication devices that are provided in the processor 200 and follow predetermined standards such as inter-integrated circuits (I2C) or improved inter-integrated circuits (I3C) are exemplified.

The communication performed by the transmission unit 210 is controlled by the image processing unit 208, for example. The recording of the image data in the recording medium such as the memory 300, the display of the image on the display screen of the display device 400, and the transmission of the region designation information indicating the set region to the image sensor 100 are realized by the image processing unit 208 causing the transmission unit 210 to transmit the various kinds of data (for example, the image data, the control information, and the like).

The processor 200 can obtain the data indicating the image corresponding to the region or the data indicating the entire image on the basis of the data received from the image sensor 100 by being provided with the header separation unit 202, the header interpretation unit 204, the payload separation unit 206, the image processing unit 208, and the transmission unit 210, for example. Note that the functional blocks of the processor 200 illustrated in FIG. 11 is obtained by dividing the functions that the processor 200 has for convenience, and how to divide the functions of the processor 200 is not limited to the example illustrated in FIG. 11. In addition, in a case in which the function of transmitting various kinds of data to the external device is not provided, the processor 200 may not have the transmission unit 210.

(2) Second Transmission Scheme (2-1) Processing Related to Second Transmission Scheme The image sensor 100 stores the region data in a payload of a first packet and stores each piece of information included in the region information in a second packet that is different from the first packet. Then, the image sensor 100 causes the first packet and the second packet to be transmitted for each row.

A long packet of MIPI is exemplified as the first packet related to the second transmission scheme while a short packet of MIPI is exemplified as the second packet related to the second transmission scheme. Note that the examples of the first packet and the second packet according to the embodiment are not limited to the examples described above. Other examples of the first packet and the second packet according to the embodiment will be described as a third transmission scheme, which will be described later. The case in which the first packet is a long packet of MIPI and the second packet is a short packet of MIPI will be exemplified for the second transmission scheme described below.

FIG. 12 is an explanatory diagram illustrating an example of data transmitted according to the second transmission scheme related to the transmission method according to the embodiment. FIG. 12 illustrates "an example in which each piece of information included in the region information corresponding to the region 1, the region 2, the region 3, and the region 4 illustrated in FIG. 5 is transmitted for each row by a short packet of MIPI illustrated in FIG. 2". In addition, FIG. 12 illustrates "an example in which the region data corresponding to each of the region 1, the region 2, the region 3, and the region 4 illustrated in FIG. 5 is stored in a payload of a long packet of MIPI illustrated in FIG. 3 and is transmitted for each row".

"Y" illustrated in FIG. 12 illustrates a short packet in which the information indicating the position of the row is stored. "I1", "I2", "I3", and "I4" illustrated in FIG. 12 illustrate short packets in which the identification information of the regions corresponding to the region 1, the region 2, the region 3, and the region 4 illustrated in FIG. 5 are respectively stored. "X1", "X2", "X3", and "X4" illustrated in FIG. 12 illustrate short packets in which the information indicating the sizes of the regions corresponding to the region 1, the region 2, the region 3, and the region 4 illustrated in FIG. 5 are respectively stored. "L1", "L2", "L3", and "I4" illustrated in FIG. 12 represent short packets in which information indicating the sizes of the regions respectively corresponding to the region 1, the region 2, the region 3, and the region 4 illustrated in FIG. 5 is stored.

In the case in which the first transmission scheme described above in (1) is used as illustrated in FIG. 6, the region information and the region data are stored in a payload of one packet, such as a long packet of MIPI, for example, and are transmitted for each row.

Meanwhile, in a case in which the second transmission scheme is used as illustrated in FIG. 12, the region information and the region data are stored separately in different packets and are transmitted for each row.

In addition, it is possible to transmit "Embedded Data" even in the case in which the second transmission scheme is used as illustrated in FIG. 12 similar to the case in which the first transmission scheme is used. That is, the image sensor 100 can transmit, as "Embedded Data" illustrated in FIG. 12, one or two or more (an example of the additional information) of the information indicating the data amount of the region, the information indicating the size of the region, and the information indicating priority of the region.

(2-2) Features and Advantages of Second Transmission Scheme

The second transmission scheme related to the transmission method according to the embodiment has the features described below, for example. Note that it is needless to say that the features that the second transmission scheme related to the transmission method according to the embodiment has are not limited to the examples described below.

The additional information is transmitted by EBD, and the region information corresponding to the set region is transmitted by a short packet.

Only the information corresponding to a change point in the information included in the region information is transmitted.

It is possible to address any region with an arbitrary shape.

In addition, the region information transmitted by the short packet has features described below, for example, in the second transmission scheme. Note that it is needless to say that the features that the region information related to the second transmission scheme has are not limited to the examples described below.

In a case in which a plurality of same regions are present in one row, information of the plurality of same regions that are present in the one row is delivered by transmitting the identification information of the same regions corresponding to the number of the present regions.

Information (Y) indicating the position of the row.
Incremented by an initial value 0 (zero).
Transmitted when the transmission does not follow a predetermined order (for example, thinning-out is performed).

Identification information (I) of the region.
Transmitted when the region increases or decreases.
Transmitted in a case in which the position of the column and the ROI length of the region is changed.

Information (X) indicating the position of the column of the region.
Initial value 0 (zero).
Transmitted when some change is made.
Transmitted along with the identification information of the region as a set.

Information (L) indicating the size of the region.
Never fail to set for a row that is transmitted first.
Transmitted when some change is made
Transmitted along with the identification information of the region as a set
May be omitted in a case in which there is only one region in one row even if some change has made (since the payload length of the long packet becomes the same as the ROI length).

In addition, the second transmission scheme has advantages described below, for example.
It is possible to perform error correction of the region information.
There is backward compatibility with the CSI-2 standards that have already been defined.

It is possible to transfer any region (ROI) with an arbitrary shape.

(2-3) Configuration Example Related to Second Transmission Scheme

Next, an example of a configuration of the image sensor 100 that is compatible with the aforementioned second transmission scheme and an example of a configuration of the processor 200 that is compatible with the second transmission scheme (an example of a configuration related to the processing of data transmitted from the image sensor 100) will be described.

(2-3-1) Configuration of Image Sensor 100 (Transmission Device) that is Compatible with Second Transmission Scheme FIG. 13 is a hardware block diagram illustrating an example of a configuration of the image sensor 100 that is compatible with the second transmission scheme related to the transmission method according to the embodiment. The image sensor 100 includes an image sensor device 102 and an IC chip 150, for example. The image sensor 100 illustrated in FIG. 13 operates using electrical power or the like supplied from an internal power source (not illustrated) that is included in the communication system 1000 similarly to the image sensor 100 illustrated in FIG. 10.

The image sensor device 102 illustrated in FIG. 13 has a function and a configuration that are similar to those of the image sensor device 102 illustrated in FIG. 10.

The IC chip 150 is obtained by forming an IC, on which circuits related to the function of transmitting data according to the second transmission scheme are integrated, into a chip shape, processes the image data delivered from the image sensor device 102, and transmits data corresponding to the generated image. Note that the circuits related to the function of transmitting data according to the second transmission scheme is not limited to implementation in the form of one IC chip and may be formed of a plurality of IC chips.

The IC chip 150 includes an image processing circuit 152, a LINK control circuit 108, an ECC generation circuit 110, a PH generation circuit 154, an EBD buffer 114, an image data buffer 116, a synthesis circuit 156, and a transmission circuit 120, for example.

The link control circuit 108, the ECC generation circuit 110, the EBD buffer 114, the image data buffer 116, and the transmission circuit 120 illustrated in FIG. 13 have functions and configurations that are similar to those of the LINK control circuit 108, the ECC generation circuit 110, the EBD buffer 114, the image data buffer 116, and the transmission circuit 120 illustrated in FIG. 10, respectively.

The image processing circuit 152 is a circuit that has a function of performing the processing related to the transmission method according to the embodiment. In a case in which the processing related to the transmission method according to the embodiment is performed, the image processing circuit 152 sets the region information for each row in the image and causes the LINK control circuit 108, the ECC generation circuit 110, the PH generation circuit 154, the EBD buffer 114, the image data buffer 116, the synthesis circuit 156, and the transmission circuit 120 to transmit the set region information and the region data corresponding to the region for each row according to the second transmission scheme. In addition, the image processing circuit 152 can also cause the image data delivered from the image sensor device 102 (that is, data indicating the entire image) to be transmitted for each row.

As the image processing circuit 152, a processor such as an MPU is exemplified.

The functions that the image processing circuit 152 has will be divided into functional blocks and will be described. As illustrated in FIG. 13, the image processing circuit 152 has a region cutting unit 122, an image processing control unit 124, and an encoding unit 158, for example.

The functions of the region cutting unit 122 and the image processing control unit 124 illustrated in FIG. 13 are similar to those of the region cutting unit 122 and the image processing control unit 124 illustrated in FIG. 10.

The encoding unit 158 encodes the image data delivered from the image sensor device 102 by a predetermined scheme similarly to the encoding unit 126 illustrated in FIG. 10.

In a case in which the region information is not acquired from the image processing control unit 124, the encoding unit 158 delivers the encoded image data to the image data buffer 116 similarly to the encoding unit 126 illustrated in FIG. 10.

In addition, in a case in which the region information is acquired from the image processing control unit 124, the encoding unit 158 specifies the region on the basis of the acquired region information and delivers the encoded region data corresponding to the specified region to the image data buffer 116.

The image processing circuit 152 performs the processing related to the transmission method according to the embodiment by being provided with the region cutting unit 122, the image processing control unit 124, and the encoding unit 158. Note that the functional blocks of the image processing circuit 152 illustrated in FIG. 13 are obtained by dividing the functions that the image processing circuit 152 has for convenience, and how to divide the functions of the image processing circuit 152 is not limited to the example illustrated in FIG. 13.

The PH generation circuit 154 generates a short packet in which each piece of information included in the region information is stored, on the basis of the region information delivered from the image processing circuit 152 (the image processing control unit 124 in the example in FIG. 13).

In addition, the PH generation circuit 154 generates a packet header of a long packet for each row by using frame information similarly to the PH generation circuit 112 illustrated in FIG. 10.

The synthesis circuit 156 generates, as a packet to be transferred, "a short packet in which the region information is stored" and "a long packet in which the image data (the ordinary data or the region data) or each row is stored in the payload" on the basis of the data acquired from each of the ECC generation circuit 110, the PH generation circuit 154, the EBD buffer 114, and the image data buffer 116.

The transmission circuit 120 transmits the packet delivered from the synthesis circuit 156 via the data bus B1 for each row.

In a case in which the region 1, the region 2, the region 3, and the region 4 illustrated in FIG. 5 have been set, for example, the transmission circuit 120 stores each piece of information included in the region information in a short packet, stores the region data in the payload of the long packet, and causes the information and the data to be transmitted for each row as illustrated in FIG. 12.

In addition, in a case in which no region is set, that is, in a case in which ordinary data is output from the image data buffer 116, the transmission circuit 120 transmits the long packet in which the data corresponding to each row is stored in the payload, for each row similarly to the transmission circuit 120 illustrated in FIG. 10. Note that the transmission circuit 120 can transmit the additional information as "Embedded Data" similarly to the transmission circuit 120 illustrated in FIG. 10.

The image sensor 100 that is compatible with the second transmission scheme has a hardware configuration illustrated in FIG. 13, for example. Note that it is needless to say that the hardware configuration of the image sensor 100 that is compatible with the second transmission scheme is not limited to the example illustrated in FIG. 13.

(2-3-2) Configuration of Processor 200 (Reception Device) that is Compatible with Second Transmission Scheme FIG. 14 is a functional block diagram illustrating an example of a configuration of the processor 200 that is compatible with the second transmission scheme related to the transmission method according to the embodiment. The processor 200 has a packet separation unit 250, a short packet interpretation unit 252, a long packet interpretation unit 254, a header interpretation unit 256, a payload interpretation unit 258, an image processing unit 208, and a transmission unit 210, for example.

The packet separation unit 250 separates the short packet and the long packet from the received data. The packet separation unit 250 separates the short packet and the long packet by detecting the division of the short packet, for example.

The short packet interpretation unit 252 extracts various kinds of information included in the region information from the short packet delivered from the packet separation unit 250 and delivers the region information to the image processing unit 208.

The long packet interpretation unit 254 separates header data corresponding to the header portion and payload data corresponding to the payload portion from the long packet delivered from the packet separation unit 250 similarly to the header separation unit 202 illustrated in FIG. 11.

The header interpretation unit 256 interprets content indicated by the header data. For example, the header interpretation unit 256 interprets whether or not the payload data is "Embedded Data". In addition, the header interpretation unit 256 may specify the position of the payload data and deliver the specified position to the long packet interpretation unit 254.

The payload interpretation unit 258 extracts the additional information or the image data (the ordinary data or the region data; the same applies to the description of FIG. 14 below) from the payload data on the basis of the result of the interpretation performed by the header interpretation unit 256.

In a case in which the header interpretation unit 256 interprets that the payload data is "Embedded Data", for example, the payload interpretation unit 258 regards the payload data as the additional information.

In addition, in a case in which the header interpretation unit 256 does not interpret that payload data is "Embedded Data", the payload interpretation unit 258 regards the payload data as image data.

The image processing unit 208 illustrated in FIG. 14 processes the image data for each row on the basis of the additional information, the region information, and the image data and obtains the data indicating the image corresponding to the region or the data indicating the entire image similarly to the image processing unit 208 illustrated in FIG. 11.

In addition, the image processing unit 208 illustrated in FIG. 14 can perform a variety of kinds of processing such as processing related to control of recording of the image data in the recording medium such as the memory 300, processing related to control of display of an image on the display screen of the display device 400, and processing related to setting of the region in the image similarly to the image processing unit 208 illustrated in FIG. 11.

The transmission unit 210 illustrated in FIG. 14 transmits variety of kinds of data (for example, the image data, the control information, and the like) to an external device via the control bus B2 or various signal lines similarly to the transmission unit 210 illustrated in FIG. 11.

The processor 200 can obtain data indicating an image corresponding to the region or data indicating the entire image on the basis of the data received from the image sensor 100 by being provided with the packet separation unit 250, the short packet interpretation unit 252, the long packet interpretation unit 254, the header interpretation unit 256, the payload interpretation unit 258, the image processing unit 208, and the transmission unit 210. Note that the functional blocks of the processor 200 illustrated in FIG. 14 are obtained by dividing the functions that the processor 200 has for convenience, and how to divide the functions of the processor 200 is not limited to the example illustrated in FIG. 14. In Addition, in a case in which the function of transmitting various kinds of data to the external device is not provided, the processor 200 may not have the transmission unit 210 similarly to the processor 200 illustrated in FIG. 11.

(3) Third Transmission Scheme (3-1) Processing Related to Third Transmission Scheme The image sensor 100 stores the region data in the payload of the first packet and stores the information included in the region information in the second packet that is different from the first packet similarly to the second transmission scheme described above in (2). Then, the image sensor 100 causes the first packet and the second packet to be transmitted for each row.

A long packet of MIPI is exemplified as the first packet related to the third transmission scheme, and a packet header is exemplified as the second packet related to the third transmission scheme. That is, the region information is transmitted by the short packet of MIPI, for example, in the second transmission scheme while the region information is transmitted by the packet header in the third transmission scheme.

Here, the short packet and the packet header have similar structures as illustrated in FIGS. 2 and 3. Accordingly, the image sensor 100 using the third transmission scheme can transmit the region information and the region data for each row similarly to the image sensor 100 using the second transmission scheme described above in (2).

Note that the second packet related to the third transmission scheme is not limited to the packet header that has a structure similar to that of the packet header illustrated in FIG. 3. For example, the second packet related to the third transmission scheme may be a packet header (for example, a packet header obtained by expanding "Data Field" from 2 bytes to 3 bytes or more) that has a structure in which "Data Field" illustrated in FIG. 2 has been expanded. In a case in which the second packet related to the third transmission scheme is a packet header that has the aforementioned expanded structure, the information included in the region information can be stored in one second packet.

In addition, the region in which the information included in the region information is stored may be a part of the first packet in the third transmission scheme. That is, it is possible to regard that the aforementioned first packet and the aforementioned second packet as one packet in the third transmission scheme.

(3-2) Features and Advantages of Third Transmission Scheme

The third transmission scheme related to the transmission method according to the embodiment has features that are similar to that of the second transmission scheme described above in (2).

In addition, the third transmission scheme has advantages described below, for example.

Transmission efficiency is high.
It is possible to perform error correction of region information.
It is possible to transfer any region (ROI) with an arbitrary Shape.

(3-3) Configuration example related to third transmission scheme

The image sensor 100 that is compatible with the third transmission scheme employs a configuration similar to that (including the modification examples) of the image sensor 100 that is compatible with the second transmission scheme described above in (2) as illustrated in FIG. 13, for example. In addition, the processor 200 that is compatible with the third transmission scheme employs a configuration that is similar to that (including the modification examples) of the processor 200 that is compatible with the second transmission scheme described above in (2) as illustrated in FIG. 14, for example.

<4> Examples of Advantages Achieved by Transmission Method According to the Embodiment being Used Advantages described below are achieved by the transmission method according to the embodiment being used. Note that it is needless to say that the advantages achieved by the transmission method according to the embodiment being used are not limited to the examples described below.

It is not necessary to divide VC for each region when the data of the region (ROI) set in the image is transferred.
It is possible to collectively transmit the data of the respective regions included in the same row when the data of the region (ROI) set in the image is transferred.
It is possible to transmit only information corresponding to a change point in the information included in the region information and to further reduce the data amount of the region information (that is, it is possible to transfer the minimum region information).
It is possible to address any region with an arbitrary shape such as a rectangular shape, an oval shape, and a donut shape.
It is possible to transfer data of regions even in a case in which the set regions are overlaid such as the region 3 and the region 4 in FIG. 5.
In a case in which the first transmission scheme is used, the period of LPS does not increase due to the transmission of the region information since the region information is stored in the payload of the packet and is then transmitted. Accordingly, there is a low possibility that the region information affects the transfer efficiency in the case in which the first transmission scheme is used.

(Program According to the Embodiment)

It is possible to transmit data of any region with an arbitrary shape set in an image by executing, by a processor or the like in a computer, a program that causes the computer to function as the transmission device according to the embodiment (for example, a program that causes the computer to execute the processing related to the transmission method according to the embodiment).

In addition, effects that are achieved by the aforementioned transmission method according to the embodiment being used can be achieved by the program that causes the computer to function as the transmission device according to the embodiment being executed by a processor or the like in the computer.

It should be understood by those skilled in the art that various modifications, combinations, sub-combinations and alterations may occur depending on design requirements and other factors insofar as they are within the scope of the appended claims or the equivalents thereof.

Although the above description has illustrated that the program (computer program) that causes the computer to function as the transmission device according to the embodiment is provided, the embodiment can further provide a recording medium with the aforementioned program stored therein together.

The aforementioned configurations are examples of the embodiment, and it is a matter of course that the aforementioned configuration belongs to a technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A transmission device including:
an image processing unit that sets region information corresponding to a region set in an image for each of rows in the image and causes the set region information and region data corresponding to the region to be transmitted for each row,
in which the region information includes information indicating a position of the row and information indicating a position of a column of the region included in the row.

(2)

The transmission device according to (1), in which the region information further includes identification information of the region included in the row and information indicating a size of the region included in the row.

(3)

The transmission device according to (1) or (2), in which the image processing unit collectively sets, in the region information, information included in the region information for the each region.

(4)

The transmission device according to (3), in which, in a case in which a plurality of the same regions are present in one row, the image processing unit sets the region information such that a number of pieces of region information is a same as a number of the same regions that are present.

(5)

The transmission device according to any one of (1) to (4), in which the image processing unit does not set, in the region information, information that does not change from information included in the region information in a row to be transmitted immediately before.

(6)

The transmission device according to (5),
in which, when the information indicating the position of the column of the region is set in the region information, the image processing unit sets, in the region information, identification information of the region, and when the information indicating a size of the region is set in the region information, the image processing unit sets, in the region information, identification information of the region.

(7)

The transmission device according to (5) or (6), in which the image processing unit causes the region information and the region data for each row to be transmitted in accordance with a predetermined order, and in a case in which the row whose region information and region data are caused to be transmitted is a row in accordance with the predetermined order, the information indicating the position of the row is not set in the region information.

(8)

The transmission device according to any one of (1) to (7), in which the image processing unit causes the region information and the region data to be stored and transmitted in a payload of a packet.

(9)

The transmission device according to (8), in which the region information is stored in a head portion of the payload.

(10)

The transmission device according to (8) or (9), in which the image processing unit further causes change information, which indicates whether or not information included in the region information has changed from the region information included in a packet that is caused to be transmitted immediately before, to be transmitted for each row.

(11)

The transmission device according to (10), in which, in a case in which the information included in the region information has not changed from the region information included in the packet that is caused to be transmitted immediately before, the image processing unit does not cause the region information to be transmitted.

(12)

The transmission device according to any one of (8) to (11), in which the image processing unit further causes one or two or more of information indicating an amount of data in the region, information indicating a size of the region, and information indicating priority of the region to be transmitted.

(13)

The transmission device according to any one of (8) to (12), in which the packet is a long packet of MIPI.

(14)

The transmission device according to any one of (1) to (7), in which the image processing unit stores the region data in a payload of a first packet, the image processing unit stores each piece of information included in the region information in a second packet that is different from the first packet, and the image processing unit causes the first packet and the second packet to be transmitted for each row.

(15)

The transmission device according to (13), in which the first packet is a long packet of MIPI, and the second packet is a short packet of MIPI.

REFERENCE SIGNS LIST 100 image sensor
102 image sensor device
104, 150 IC chip
106, 152 image processing circuit
108 LINK control circuit
110 ECC generation circuit
112, 154 PH generation circuit
114 EBD buffer
116 image data buffer
118, 156 synthesis circuit
120 transmission circuit
122 region cutting unit
124 image processing control unit
126, 158 encoding unit
200 processor
202 header separation unit
204 header interpretation unit
206 payload separation unit
208 image processing unit
210 transmission unit
212 decoding unit
214 image generation unit
250 packet separation unit
252 short packet interpretation unit
254 long packet interpretation unit
256 header interpretation unit
258 payload interpretation unit
300 memory
400 display device
1000 communication system
B1 data bus
B2 control bus

The invention claimed is:

1. A transmission device comprising:
an image processing circuitry having a Region-Of-Interest (ROI) mode and a non-Region-Of-Interest (ROI) mode, the image processing circuitry, in the ROI mode, is configured to
transmit a first frame of data of an image, the first frame of data including embedded data, Region-Of-Interest (ROI) information for each image line of a first plurality of image lines of the image, and Region-Of-Interest (ROI) data for each image line of a second plurality of image lines of the image, the second plurality of image lines including the first plurality of image lines, and
the image processing circuitry, in the non-ROI mode, is configured to transmit a second frame of data of the image, the second frame of data including all payload data for each image line of a third plurality of image lines of the image, the third plurality of image lines including the second plurality of image lines, and the second frame of data does not include the ROI information and the ROI data.

2. The transmission device according to claim 1, wherein the image processing circuitry, in the ROI mode, is further configured to
determine whether the ROI information for each image line of the first plurality of image lines can be embedded into the embedded data,
insert the ROI information for each image line of the first plurality of image lines into the embedded data in response to determining that the ROI information can be embedded into the embedded data, and
transmit a third frame of data of the image instead of the first frame of data, the third frame of data including the embedded data and the ROI data for each image line of the second plurality of image lines in response to inserting the ROI information into the embedded data.

3. The transmission device according to claim 1, wherein the image processing circuitry, in the ROI mode, is further configured to
receive position information of one or more Regions-Of-Interest (ROIs) in the image, and
determine the second plurality of image lines based on the position information.

4. The transmission device according to claim 3, wherein the image processing circuitry, in the ROI mode, is further configured to
determine one or more change points of the one or more Regions-Of-Interest (ROIs) in the image based on the position information, and
determine the first plurality of image lines based on the one or more change points.

5. The transmission device according to claim 4, wherein the ROI information for each image line of the first plurality of image lines further includes change information indicative of the one or more change points.

6. The transmission device according to claim 1, wherein the ROI information for each image line of the first plurality of image lines is information indicating a position of the each image line and a position of a column of one or more Regions-Of-Interest (ROIs) included in the each image line.

7. The transmission device according to claim 6, wherein the ROI information further includes identification information of the one or more Regions-Of-Interest (ROIs) included in the each image line and information indicating a size of the one or more Regions-Of-Interest (ROIs) included in the each image line.

8. The transmission device according to claim 6, wherein the one or more Regions-Of-Interest (ROIs) included in the each image line is n, n being a positive integer greater than zero, the image processing circuitry is further configured to include a number of pieces of region information in the ROI information, the number of pieces of region information being equal to n.

9. The transmission device according to claim 1, wherein the second plurality of image lines are transmitted in accordance with a predetermined order, and wherein the ROI information for each image line of the first plurality of image lines does not include information indicating a position of the each image line.

10. The transmission device according to claim 1, wherein the first frame of data comprises a plurality of packets, wherein the embedded data is transmitted in one or more payloads of a first portion of the plurality of packets, and wherein the ROI information and the ROI data for each image line of the first plurality of image lines are transmitted in payloads of a second portion of the plurality of packets, the second portion of the plurality of packets does not include the first portion of the plurality of packets.

11. The transmission device according to claim 10, wherein the ROI information is stored in a head portion of the payloads.

12. The transmission device according to claim 1, wherein the embedded data further includes at least one of:
information indicating an amount of data of one or more Regions-Of-Interest (ROIs) in the image,
information indicating a size of the one or more ROIs in the image, or
information indicating priority of the one or more ROIs in the image.

13. The transmission device according to claim 1, wherein the embedded data further includes at least one of:
identification information of one or more Regions-Of-Interest (ROIs) in the image,
information indicating a upper-left coordinate of the one or more ROIs in the image,
information indicating a height of the one or more ROIs in the image,
information indicating a width of the one or more ROIs in the image,
analog-to-digital bits indicating a resolution of an analog-to-digital converter, or
sensing information.

14. The transmission device according to claim 13, wherein the sensing information includes at least one of information of a gain setting or information of an exposure time, and wherein the embedded data has a variable number of bytes allocated to the sensing information.

15. A reception device comprising:
an electronic processor configured to
receive a first frame of data of an image,
receive a second frame of data the image, and
generate a display image based on one of the first frame of data or the second frame of data,
wherein the first frame of data includes embedded data, Region-Of-Interest (ROI) information for each image line of a first plurality of image lines of the image, and Region-Of-Interest (ROI) data for each image line of a second plurality of image lines of the image, the second plurality of image lines including the first plurality of image lines, and
wherein the second frame of data includes all payload data for each image line of a third plurality of image lines of the image, the second frame of data does not include the ROI information and the ROI data.

16. The reception device according to claim 15, wherein the electronic processor is further configured to
receive a third frame of data of the image, and
generate the display image based on the third frame of data, the third frame of data including the embedded data and the ROI data for each image line of the second plurality of image lines of the image, the embedded data including the ROI information for each image line of the first plurality of image lines of the image.

17. A system comprising:
a transmission device including
an image processing circuitry having a Region-Of-Interest (ROI) mode and a non-Region-Of-Interest (ROI) mode, the image processing circuitry, in the ROI mode, is configured to
transmit a first frame of data of an image, the first frame of data including embedded data, Region-Of-Interest (ROI) information for each image line of a first plurality of image lines of the image, and Region-Of-Interest (ROI) data for each image line of a second plurality of image lines of the image, the second plurality of image lines including the first plurality of image lines, and
the image processing circuitry, in the non-ROI mode, is configured to transmit a second frame of data of the image, the second frame of data including all payload data for each image line of a third plurality of image lines of the image, the third plurality of image lines including the second plurality of image lines, the second frame of data does not include the ROI information and the ROI data; and
an electronic processor configured to
receive the first frame of data,
receive the second frame of data, and
generate a display image based on one of the first frame of data or the second frame of data.

18. The system according to claim 17, wherein in the ROI mode, the image processing circuitry is further configured to
- determine whether the ROI information for each image line of the first plurality of image lines can be embedded into the embedded data,
- insert the ROI information for each image line of the first plurality of image lines into the embedded data in response to determining that the ROI information can be embedded into the embedded data, and
- transmit a third frame of data of the image instead of the first frame of data, the third frame of data including the embedded data and the ROI data for each image line of the second plurality of image lines in response to inserting the ROI information into the embedded data, and
- wherein the electronic processor is further configured to receive the third frame of data and generate the display image based on the third frame of data.

19. A method comprising:
- receiving, with an image processing circuitry, a mode selection input, the mode selection input being indicative of one of a Region-Of-Interest (ROI) mode or a non-Region-Of-Interest (ROI) mode;
- responsive to the mode selection input being indicative of the ROI mode, transmitting, with the image processing circuitry, a first frame of data of an image, the first frame of data including embedded data, Region-Of-Interest (ROI) information for each image line of a first plurality of image lines of the image, and Region-Of-Interest (ROI) data for each image line of a second plurality of image lines of the image, the second plurality of image lines including the first plurality of image lines; and
- responsive to the mode selection input being indicative of the non-ROI mode, transmitting, with the image processing circuitry, a second frame of data of the image, the second frame of data including all payload data for each image line of a third plurality of image lines of the image, the third plurality of image lines including the second plurality of image lines, the second frame of data does not include the ROI information and the ROI data.

20. The method according to claim 19, further comprising:
- determining, with the image processing circuitry, whether the ROI information for each image line of the first plurality of image lines can be embedded into the embedded data;
- responsive to determining that the ROI information can be embedded into the embedded data, inserting, with the image processing circuitry, the ROI information for each image line of the first plurality of image lines into the embedded data; and
- responsive to the mode selection input being indicative of the ROI mode and responsive to inserting the ROI information into the embedded data, transmitting, with the image processing circuitry, a third frame of data of the image instead of the first frame of data, the third frame of data including the embedded data and the ROI data for each image line of the second plurality of image lines.

* * * * *